United States Patent
Toyoshima et al.

(10) Patent No.: US 11,329,265 B2
(45) Date of Patent: May 10, 2022

(54) METHOD FOR PRODUCING BATTERY ELECTRODE

(71) Applicant: NISSAN MOTOR CO., LTD., Yokohama (JP)

(72) Inventors: Kenichi Toyoshima, Kanagawa (JP); Tooru Kosemura, Kanagawa (JP); Yuichiro Yokoyama, Kyoto (JP); Yusuke Emori, Kyoto (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 16/754,828

(22) PCT Filed: Oct. 10, 2018

(86) PCT No.: PCT/JP2018/037810
§ 371 (c)(1),
(2) Date: May 4, 2020

(87) PCT Pub. No.: WO2019/074024
PCT Pub. Date: Apr. 18, 2019

(65) Prior Publication Data
US 2020/0313156 A1    Oct. 1, 2020

(30) Foreign Application Priority Data

Oct. 10, 2017    (JP) .............................. JP2017-196922

(51) Int. Cl.
*H01M 4/04* (2006.01)
*H01M 4/36* (2006.01)
(Continued)

(52) U.S. Cl.
CPC ......... *H01M 4/0404* (2013.01); *H01M 4/366* (2013.01); *H01M 4/624* (2013.01); *H01M 10/0525* (2013.01)

(58) Field of Classification Search
CPC .................................................. H01M 4/0404
See application file for complete search history.

(56) References Cited

U.S. PATENT DOCUMENTS

| 2011/0111292 A1 | 5/2011 | Kwon et al. |
| 2014/0030580 A1 | 1/2014 | Tenzer et al. |
| (Continued) | | |

FOREIGN PATENT DOCUMENTS

| JP | 10-188962 A | 7/1998 |
| JP | 2001-266855 A | 9/2001 |
| (Continued) | | |

*Primary Examiner* — Austin Murata
(74) *Attorney, Agent, or Firm* — Foley & Lardner LLP

(57) ABSTRACT

Provided is a means capable of improving the flatness of a surface of an electrode active material layer in which an electrode active material slurry without assuming addition of a binder.

Upon producing a battery electrode which has a current collector and an electrode active material layer disposed on a surface of the current collector and containing an electrode active material, in a coating step of coating an electrode active material slurry in which the electrode active material is dispersed in a solvent on the surface of the current collector to form the electrode active material layer, an electrode active material slurry which has flow characteristics that a region A in which a shear stress is not increased according to an increase in shear rate is present and a region B in which a shear stress is increased and an increase rate thereof is decreased according to an increase in shear rate is present in a region having a shear rate larger than that of the region A, in a shear rate (horizontal axis)-shear stress (vertical axis) curve of the electrode active material slurry, is used as the electrode active material slurry, and, coating of the electrode active material slurry is performed at a coating rate at which the shear rate at the time of coating is (Continued)

a value in which a shear stress equal to or more than a yield stress of the electrode active material slurry is applied in the coating step.

5 Claims, 3 Drawing Sheets

(51) Int. Cl.
*H01M 4/62* (2006.01)
*H01M 10/0525* (2010.01)

(56) References Cited

U.S. PATENT DOCUMENTS

| | | |
|---|---|---|
| 2015/0287993 A1 | 10/2015 | Komaba et al. |
| 2015/0357648 A1 | 12/2015 | Sugimoto et al. |

FOREIGN PATENT DOCUMENTS

| | | |
|---|---|---|
| JP | 2013-120710 A | 6/2013 |
| JP | 2013-182822 A | 9/2013 |
| JP | 2014-207141 A | 10/2014 |
| JP | 2015-141773 A | 8/2015 |
| JP | 2015-141822 A | 8/2015 |
| JP | 2016-91902 A | 5/2016 |
| WO | WO 2014/065407 A1 | 5/2014 |
| WO | WO 2014/119790 A1 | 8/2014 |

METHOD FOR PRODUCING BATTERY ELECTRODE

TECHNICAL FIELD

The present invention relates to a method for producing a battery electrode.

BACKGROUND ART

In recent years, the use of various electric vehicles has been promoted with the expectation of solving environmental and energy issues. Secondary batteries are being developed intensively as a vehicle-mounted power source such as a motor drive power source, which holds the key to the widespread use of these electric vehicles. In the electric vehicles, in order to lengthen a cruising distance per one charge, secondary batteries having a higher energy density are desired.

As a technique for improving the energy density of a non-aqueous electrolyte secondary battery such as a lithium ion secondary battery, searching of an electrode active material having a higher capacity has been intensively conducted. For example, a silicon-containing negative electrode active material occludes/releases 3.75 mol of lithium ions per 1 mol as in the following Reaction Formula (A) in charging and discharging, and in $Li_{15}Si_4$ (=$Li_{3.75}Si$), an extremely high theoretical capacity thereof of 3600 mAh/g is shown.

[Chem. 1]

$$Si + 3.75 Li^+ + e^- \rightleftharpoons Li_{3.75}Si \qquad (A)$$

On the other hand, with occlusion and release of lithium ions, the silicon-containing negative electrode active material is greatly expanded and contracted. Therefore, in a negative electrode active material layer containing silicon-containing negative electrode active material, there is a concern that the structural disorder caused by expansion and contraction of the negative electrode active material occurs as charge-discharge cycle proceeds. Further, in order to suppress the structural disorder in the negative electrode active material layer containing such a silicon-containing negative electrode active material, a technique of containing cross-linked polyacrylic acid or a neutralized product thereof as a binder has been conventionally proposed (see WO 2014/065407 A).

However, in the technique described in WO 2014/065407 A, when the degree of cross-linkage of the cross-linked polyacrylic acid or a neutralized product thereof used as a binder increases, fluidity of the negative electrode active material slurry for forming the negative electrode active material layer is decreased, and the flow characteristics of the slurry becomes thixotropic. The flatness of the surface of the negative electrode active material layer formed by coating such a negative electrode active material slurry having a high viscosity on the surface of a current collector is significantly low. When the flatness of the surface of the active material layer is low, the distance between electrodes (the distance between surfaces of the respective active material layers) becomes uneven in the plane, and thus a difference in potential occurs in the plane of the electrode. As a result, in a portion in which the charge and discharge reaction does not sufficiently proceed, phenomena such as precipitation or sedimentation of lithium ions occur and a problem arises in that the battery capacity is decreased.

SUMMARY OF INVENTION

Technical Problem

In this regard, an object of the present invention is to provide a means capable of improving the flatness of a surface of an electrode active material layer obtained by coating an electrode active material slurry having thixotropic flow characteristics.

Solution to Problem

The present inventors have conducted intensive studies in order to solve the above problems. As a result, the present inventors have found that a flat coating film is obtained without increasing an amount of a binder added, by coating an electrode active material slurry characterized by a specific profile in a shear rate (horizontal axis)-shear stress (vertical axis) curve and increasing a shear rate at the time of coating to a predetermined lower limit value or more.

That is, an aspect of the present invention relates to a method for producing a battery electrode which has a current collector and an electrode active material layer disposed on a surface of the current collector and containing an electrode active material. Further, the method for producing a battery electrode includes a coating step of coating an electrode active material slurry in which the electrode active material is dispersed in a solvent on the surface of the current collector to form a coating film. Herein, the electrode active material slurry has flow characteristics that a region A in which a shear stress is not increased according to an increase in shear rate is present and a region B in which a shear stress is increased and an increase rate thereof is decreased according to an increase in shear rate is present in a region having a shear rate larger than that of the region A, in a shear rate (horizontal axis)-shear stress (vertical axis) curve of the electrode active material slurry. Further, it is characterized in that coating of the electrode active material slurry is performed at a coating rate at which the shear rate at the time of coating becomes a value in which a shear stress equal to or more than a yield stress of the electrode active material slurry is applied in the coating step.

DESCRIPTION OF EMBODIMENTS

Figure 1:
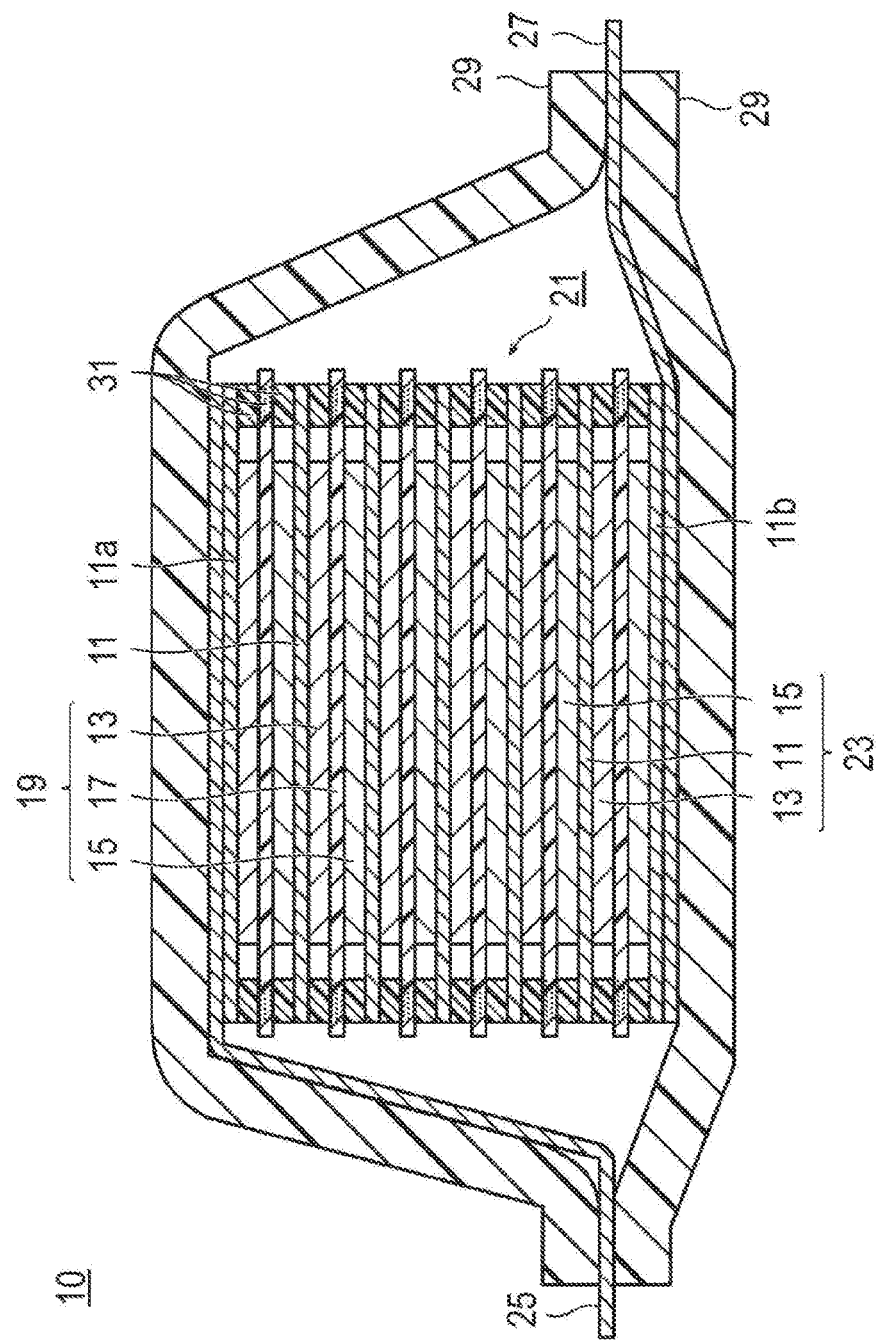
FIG. 1 is a cross-sectional view schematically illustrating a bipolar type secondary battery of an embodiment of the present invention.

According to an aspect of the present invention, provided is a method for producing a battery electrode which has a current collector and an electrode active material layer disposed on a surface of the current collector and containing an electrode active material, the method including: a coating step of coating an electrode active material slurry in which the electrode active material is dispersed in a solvent on the surface of the current collector to form the electrode active material layer, in which the electrode active material slurry has flow characteristics that a region A in which a shear stress is not increased according to an increase in shear rate is present and a region B in which a shear stress is increased and an increase rate thereof is decreased according to an increase in shear rate is present in a region having a shear rate larger than that of the region A, in a shear rate (horizontal axis)-shear stress (vertical axis) curve of the electrode active material slurry, and, coating of the electrode active material slurry is performed at a coating rate at which the shear rate at the time of coating is a value in which a shear stress equal to or more than a yield stress of the electrode active material slurry is applied in the coating step. According to the method for producing a battery electrode according to this aspect, it is possible to form an electrode active material layer with improved surface flatness without increasing an amount of a binder added. Therefore, the present invention is effective in both an increase in energy density of the battery and battery characteristics such as cycle durability.

Hereinafter, while referring to the drawings, an embodiment of the present invention will be described, but the technical scope of the present invention should be determined based on the scope of claims, and is not limited only to the following embodiments. Incidentally, hereinafter, a battery electrode according to the present invention will be described and then a method for producing an electrode according to the present invention will be described in detail for convenience sake. As a preferred embodiment of the present invention, first, a bipolar type lithium ion secondary battery that is one of non-aqueous electrolyte secondary batteries will be described as an example of a battery, but is not limited only to the following embodiments. Incidentally, the scale of the drawings includes some exaggeration for descriptive reasons, and may thus be different from the actual dimension. In the present specification, "X to Y" representing a range means "X or more and Y or less." Further, unless otherwise specified, operation and measurement of physical properties and the like are performed under a condition of room temperature (20 to 25° C.)/relative humidity of 40 to 50%.

In the present specification, in some cases, a bipolar type lithium ion secondary battery is simply referred to as a "bipolar type secondary battery" and a bipolar type lithium ion secondary battery electrode is simply referred to as a "bipolar type electrode."

<Bipolar Type Secondary Battery>

FIG. 1 is a cross-sectional view schematically illustrating a bipolar type secondary battery of an embodiment of the present invention. A bipolar type secondary battery 10 illustrated in FIG. 1 has a configuration in which a power generating element 21 with a substantially rectangular shape, in which a charge and discharge reaction actually proceeds, is sealed in the inside of a laminate film 29, which is a battery outer casing body.

As illustrated in FIG. 1, the power generating element 21 of the bipolar type secondary battery 10 of this embodiment includes a plurality of bipolar type electrodes 23 in which a positive electrode active material layer 13 electrically connected to one surface of a current collector 11 and a negative electrode active material layer 15 electrically connected to the other surface of the current collector 11 are formed. The respective bipolar type electrodes 23 are stacked on top of each other via electrolyte layers 17 to form the power generating element 21. Incidentally, the electrolyte layers 17 each have a configuration in which an electrolyte is held in the middle portion in the plane direction of a separator serving as a base material. At this time, the bipolar type electrodes 23 and the electrolyte layers 17 are alternately stacked in such a manner that the positive electrode active material layer 13 of one bipolar type electrode 23 faces the negative electrode active material layer 15 of another bipolar type electrode 23 adjacent to the one bipolar type electrode 23 via the electrolyte layer 17. That is, the electrolyte layer 17 is disposed to be interposed between the positive electrode active material layer 13 of one bipolar type electrode 23 and the negative electrode active material layer 15 of another bipolar type electrode 23 adjacent to the one bipolar type electrode 23.

Incidentally, although not illustrated in the drawing, in the bipolar type secondary battery 10 of FIG. 1, the positive electrode active material layer 13 contains a positive electrode active material (coated positive electrode active material), which is coated with a coating agent containing acetylene black as a conductive aid and a (meth)acrylate-based copolymer as a coating resin, and carbon fibers as a conductive member. The carbon fibers form a conduction path electrically connecting a first principal surface coming into contact with the electrolyte layer 17 side of the positive electrode active material layer 13 and a second principal surface coming into contact with the current collector 11 side, and the conduction path and the positive electrode active material are electrically connected. Similarly, the negative electrode active material layer 15 contains a negative electrode active material (coated negative electrode active material), which is coated with a coating agent containing acetylene black as a conductive aid and a (meth) acrylate-based copolymer as a coating resin, and carbon fibers as a conductive member. The carbon fibers form a conduction path electrically connecting a first principal surface coming into contact with the electrolyte layer 17 side of the negative electrode active material layer 15 and a second principal surface coming into contact with the current collector 11 side, and the conduction path and the negative electrode active material are electrically connected.

The positive electrode active material layer 13, the electrolyte layer 17, and the negative electrode active material layer 15, which are adjacent to each other, constitute one single battery layer 19. Therefore, it can also be said that the bipolar type secondary battery 10 has a configuration in which the single battery layers 19 are stacked on top of each other. Further, a sealing portion (insulating layer) 31 is disposed on the periphery of each of the single battery layer 19. According to this, liquid junction caused by leakage of an electrolyte solution from the electrolyte layer 17 is prevented and the contact between the current collectors 11 adjacent to each other inside the battery or occurrence of a short circuit caused by slight unevenness at the end portion of the single battery layer 19 in the power generating element 21 or the like is prevented. Incidentally, the positive electrode active material layer 13 is formed on only one surface in an outermost layer current collector 11a on the positive electrode side which is located on the outermost layer of the power generating element 21. Further, the negative electrode active material layer 15 is formed on only one surface in an outermost layer current collector 11b on the negative electrode side which is located on the outermost layer of the power generating element 21.

Further, in the bipolar type secondary battery 10 illustrated in FIG. 1, a positive electrode current collecting plate (positive electrode tab) 25 is disposed to be adjacent to the outermost layer current collector 11a on the positive electrode side, and extends to be drawn from the laminate film 29, which is a battery outer casing body. Meanwhile, a negative electrode current collecting plate (negative electrode tab) 27 is disposed to be adjacent to the outermost layer current collector 11b on the negative electrode side and similarly extends to be drawn from the laminate film 29.

Incidentally, the number of the single battery layers 19 stacked is adjusted depending on a desired voltage. Further, the number of the single battery layers 19 stacked in the bipolar type secondary battery 10 may be minimized as long as sufficient output can be ensured even when the thickness of the battery is made thinner as much as possible. In order to prevent external damage at the time of operation and avoid environmental worsening, the bipolar type secondary battery 10 may also have a structure in which the power generating element 21 is sealed in the laminate film 29, which is a battery outer casing body, under reduced pressure, and the positive electrode current collecting plate 25 and the negative electrode current collecting plate 27 are drawn to the outside of the laminate film 29. Incidentally, herein, the embodiment of the present invention has been described by using a bipolar type secondary battery as an example, but the type of a non-aqueous electrolyte secondary battery to which the present invention can be applied is not particularly limited. For example, the present invention can also be applied to an arbitrary non-aqueous electrolyte secondary battery of the related art, such as a so-called parallel laminate type battery, in which single battery layers are connected in parallel in a power generating element.

Hereinafter, main constituent elements of the bipolar type secondary battery of this embodiment will be described.

[Current Collector]

A current collector serves as a medium for transferring electrons from one side coming into contact with the positive electrode active material layer to the other side coming into contact with the negative electrode active material layer. The material for forming the current collector is not particularly limited, but, for example, a metal or a resin having conductivity may be used.

Specific examples of the metal include aluminum, nickel, iron, stainless steel, titanium, copper, and the like. Other than, a clad material of nickel and aluminum, a clad material of copper and aluminum, a plating material of a combination of those metals, or the like may be preferably used. Further, a foil obtained by coating a metal surface with aluminum may be used. Among them, from the viewpoint of electron conductivity, potential for operating a battery, adhesiveness of a negative electrode active material to a current collector by sputtering, or the like, aluminum, stainless steel, copper, and nickel are preferred.

Further, examples of the latter resin having conductivity include a resin in which a conductive filler is added to a conductive polymer material or a non-conductive polymer material as necessary. Examples of the conductive polymer material include polyaniline, polypyrrole, polythiophene, polyacetylene, polyparaphenylene, polyphenylene vinylene, polyacrylonitrile, polyoxadiazole, and the like. Such a conductive polymer material has an advantage in simplification of the producing process and lightness of a current collector since the conductive polymer material has sufficient conductivity even if a conductive filler is not added thereto.

Examples of the non-conductive polymer material include polyethylene (PE; high-density polyethylene (HDPE), low-density polyethylene (LDPE), or the like), polypropylene (PP), polyethylene terephthalate (PET), polyether nitrile (PEN), polyimide (PI), polyamide imide (PAI), polyamide (PA), polytetrafluoroethylene (PTFE), styrene-butadiene rubber (SBR), polyacrylonitrile (PAN), polymethyl acrylate (PMA), polymethyl methacrylate (PMMA), polyvinyl chloride (PVC), polyvinylidene fluoride (PVdF), polystyrene (PS), and the like. Such a non-conductive polymer material may have excellent potential tolerance or solvent tolerance.

A conductive filler may be added to the conductive polymer material or the non-conductive polymer material as necessary. In particular, when a resin serving as a base material of a current collector only includes a non-conductive polymer, the conductive filler is essential to provide conductivity to the resin.

The conductive filler can be used without particular limitation as long as it is a material having conductivity. Examples of a material having excellent conductivity, potential tolerance, or lithium ion insulation include metal, conductive carbon, and the like. The metal is not particularly limited, but the metal preferably includes at least one kind of metal selected from the group consisting of Ni, Ti, Al, Cu, Pt, Fe, Cr, Sn, Zn, In, Sb, and K, or an alloy or metal oxide containing these metals. Further, the conductive carbon is not particularly limited. The conductive carbon preferably includes at least one material selected from the group consisting of acetylene black, Vulcan (registered trademark), Black Pearls (registered trademark), carbon nanofiber, Ketjen black (registered trademark), carbon nanotube, carbon nanohorn, carbon nanoballoon, and fullerene.

The amount of the conductive filler added is not particularly limited as long as it can provide sufficient conductivity to the current collector, and the amount is generally about 5 to 35% by mass.

Incidentally, the current collector of this embodiment may be a single-layer structure formed by a single material or a stacked structure in which layers formed by these materials are appropriately combined. From the viewpoint of lightness of the current collector, it is preferable to contain at least a conductive resin layer formed by a resin having conductivity. Further, from the viewpoint of interrupting the movement of lithium ions between single battery layers, a metal layer may be provided on a portion of the current collector.

[Electrode Active Material Layer (Positive Electrode Active Material Layer or Negative Electrode Active Material Layer)]

The electrode active material layer (the positive electrode active material layer or the negative electrode active material layer) contains an electrode active material (a positive electrode active material or a negative electrode active material). Further, the electrode active material layer (the positive electrode active material layer or the negative electrode active material layer) may contain a coating agent containing a coating resin and, as necessary, a conductive aid which coats the surface of the electrode active material. Further, the electrode active material layer may contain a conductive member, an ion conductive polymer, a lithium salt, and the like.

Incidentally, in the present specification, the electrode active material in a state of being coated with the coating agent is also referred to as a "coated electrode active material." The coated electrode active material has a core-shell structure in which a shell portion formed by a coating agent containing a coating resin and, as necessary, a conductive aid is formed on the surface of a core portion formed by an electrode active material.

(Positive Electrode Active Material)

Examples of the positive electrode active material include $LiMn_2O_4$, $LiCoO_2$, $LiNiO_2$, $Li(Ni-Mn-Co)O_2$, lithium-transition metal composite oxide such as a compound in which a part of these transition metals is replaced with another element, a lithium-transition metal phosphate compound, a lithium-transition metal sulfate compound, and the like. In some cases, two or more kinds of the positive electrode active material may be concurrently used. From the viewpoint of capacity and output characteristics, lithium-transition metal composite oxide is preferably used as the positive electrode active material. A composite oxide containing lithium and nickel is more preferably used. $Li(Ni-Mn-Co)O_2$ and a composite oxide in which a part of these transition metals is replaced with another element (hereinafter, also simply referred to as "NMC composite oxide"), a lithium-nickel-cobalt-aluminum composite oxide (hereinafter, also simply referred to as "NCA composite oxide"), or the like are further preferably used. The NMC composite oxide has a layered crystal structure in which a lithium atom layer and a transition metal (Mn, Ni, and Co are arranged with regularity) atom layer are alternately stacked via an oxygen atom layer. Further, one Li atom is included per atom of transition metal, and extractable Li amount is twice the amount of spinel lithium manganese oxide, that is, as the supply power is two times higher, it can have high capacity.

As described above, the NMC composite oxide also includes a composite oxide in which a part of transition metal element is replaced with another metal element. In this case, examples of another metal element include Ti, Zr, Nb, W, P, Al, Mg, V, Ca, Sr, Cr, Fe, B, Ga, In, Si, Mo, Y, Sn, V, Cu, Ag, Zn, and the like, Ti, Zr, Nb, W, P, Al, Mg, V, Ca, Sr, and Cr are preferred, Ti, Zr, P, Al, Mg, and Cr are more preferred, and from the viewpoint of improving the cycle characteristics, Ti, Zr, Al, Mg, and Cr are further preferred.

By having a high theoretical discharge capacity, the NMC composite oxide preferably has a composition represented by General Formula (1): $Li_aNi_bMn_cCo_dM_xO_2$ (provided that, in the formula, a, b, c, d, and x satisfy $0.9 \le a \le 1.2$, $0 < b < 1$, $0 < c \le 0.5$, $0 < d \le 0.5$, $0 \le x \le 0.3$, and $b+c+d=1$; M represents at least one element selected from Ti, Zr, Nb, W, P, Al, Mg, V, Ca, Sr, and Cr). Herein, a represents the atomic ratio of Li, b represents the atomic ratio of Ni, c represents the atomic ratio of Co, d represents the atomic ratio of Mn, and x represents the atomic ratio of M. From the viewpoint of the cycle characteristics, it is preferable that $0.4 \le b \le 0.6$ in General Formula (1) is satisfied. Incidentally, the composition of each element can be measured, for example, by induction coupled plasma (ICP) emission spectroscopy.

In general, from the viewpoint of improving purity and improving electron conductivity of a material, nickel (Ni), cobalt (Co), and manganese (Mn) are known to contribute to capacity and output characteristics. Ti or the like replaces a part of transition metal in a crystal lattice. From the viewpoint of the cycle characteristics, it is preferable that a part of transition element is replaced with another metal element, and it is particularly preferable that $0 < x \le 0.3$ in General Formula (1) is satisfied. The crystal structure is stabilized as at least one kind selected from the group consisting of Ti, Zr, Nb, W, P, Al, Mg, V, Ca, Sr, and Cr is dissolved as a solid solution, and as a result, a decrease in capacity of a battery can be prevented even charge and discharge are repeated and it is considered that excellent cycle characteristics can be realized.

As a more preferred embodiment, from the viewpoint of improving a balance between capacity and lifetime characteristics, it is preferable that b, c, and d in General Formula (1) satisfy $0.44 \le b \le 0.51$, $0.27 \le c \le 0.31$, and $0.19 \le d \le 0.26$. For example, as compared with $LiCoO_2$, $LiMn_2O_4$, $LiNi_{1/3}Mn_{1/3}Co_{1/3}O_2$, and the like that exhibit actual performance in a general consumer use battery, $LiNi_{0.5}Mn_{0.3}Co_{0.2}O_2$ has a large capacity per unit weight. According to this, there is an advantage that a compact battery having a high capacity can be produced since the energy density can be improved, and thus $LiNi_{0.5}Mn_{0.3}Co_{0.2}O_2$ is also preferred from the viewpoint of the cruising distance. Incidentally, in terms of having a larger capacity, $LiNi_{0.8}Co_{0.1}Al_{0.1}O_2$ is more advantageous, but may have a problem in lifetime characteristics. On the other hand, $LiNi_{0.5}Mn_{0.3}Co_{0.2}O_2$ has lifetime characteristics as excellent as $LiNi_{1/3}Mn_{1/3}Co_{1/3}O_2$.

Incidentally, it is needless to say that a positive electrode active material other than the aforementioned positive electrode active material may be used. The average particle diameter of the positive electrode active material is not particularly limited, but from the viewpoint of higher output power, preferably 1 to 100 μm and more preferably 1 to 20 μm.

(Negative Electrode Active Material)

Examples of the negative electrode active material include a carbon material such as graphite (black lead), soft carbon, or hard carbon, a lithium-transition metal composite oxide (for example, $Li_4Ti_5O_{12}$), a metal material (tin or silicon), a lithium alloy-based negative electrode material (for example, a lithium-tin alloy, a lithium-silicon alloy, a lithium-aluminum alloy, a lithium-aluminum-manganese alloy, or the like), and the like. In some cases, two or more kinds of a negative electrode active material may be concurrently used. Preferably, from the viewpoint of capacity and output characteristics, a carbon material, a lithium-transition metal composite oxide, or a lithium alloy-based negative electrode material is preferably used as the negative electrode active material. Incidentally, it is needless to say that a negative electrode active material other than those described above may also be used. Further, the aforementioned coating resin has a property of easily adhering to particularly a carbon material. Therefore, from the viewpoint of providing an electrode material with a stable structure, it is preferable to use a carbon material as the negative electrode active material.

The average particle diameter of the negative electrode active material is not particularly limited, but from the viewpoint of higher output power, is preferably 1 to 100 μm and more preferably 1 to 20 μm.

(Coating Agent)

The coating agent contains a coating resin and, as necessary, a conductive aid. The coating agent is present on the surface of the electrode active material, and thus, in the electrode active material layer, the ion conduction path from the electrode active material surface to the electrolyte layer can be secured. Further, when the coating agent further contains a conductive aid, the electron conduction path from the electrode active material surface to the current collector can be secured more reliably.

(Coating Resin)

The coating resin is present on the surface of the electrode active material and has a function of absorbing and holding the electrolyte solution. According to this, in the electrode active material layer, the ion conduction path from the electrode active material surface to the electrolyte layer can be formed.

In the bipolar type secondary battery of this embodiment, the material for the coating resin is not particularly limited, but from the viewpoint of flexibility or liquid-absorbing property, preferably includes at least one selected from the group consisting of (A) a polyurethane resin and (B) a polyvinyl-based resin.

(A) Polyurethane Resin

Since the polyurethane resin has high flexibility (a large tensile elongation at break described later) and urethane bonds may form a strong hydrogen bond with each other, by using the polyurethane resin as the coating resin, it is possible to form a coating agent having a stable structure while being excellent in flexibility.

The specific form of the polyurethane resin is not particularly limited, and appropriate reference can be made to the conventionally known knowledge relating a polyurethane resin. The polyurethane resin is configured by (a1) a polyisocyanate component and (a2) a polyol component, and may be configured by further using (a3) an ionic group-introducing component, (a4) an ionic group-neutralizing agent component, and (a5) a chain extending agent component, as necessary.

Examples of (a1) the polyisocyanate component include diisocyanate compounds having two isocyanate groups in one molecule and polyisocyanate compounds having three or more isocyanate groups in one molecule. These may be used alone or in combination of two or more kinds thereof.

Examples of the diisocyanate compounds include aromatic diisocyanates such as 4,4'-diphenylmethane diisocyanate (MDI), 2,4- and/or 2,6-tolylenediisocyanate, p-phenylenediisocyanate, xylylene diisocyanate, 1,5-naphthalene diisocyanate, 3,3'-dimethyldiphenyl-4,4'-diisocyanate, dianisidine diisocyanate, and tetramethylxylylene diisocyanate; alicyclic diisocyanates such as isophorone diisocyanate, dicyclohexylmethane-4,4'-diisocyanate, trans-1,4-cyclohexyl diisocyanate, and norbornene diisocyanate; and aliphatic diisocyanates such as 1,6-hexamethylene diisocyanate, 2,2,4 and/or (2,4,4)-trimethylhexamethylene diisocyanate, and lysine diisocyanate.

These diisocyanate compounds may be used in the form of a modified body such as carbodiimide-modified, isocyanurate-modified, or biuret-modified and also may be used in the form of a block isocyanate blocked with various blocking agents.

Examples of the polyisocyanate compound having three or more isocyanate groups in one molecule include isocyanurate trimers, biuret trimers, trimethylolpropane adducts, and the like of the diisocyanate provided above as examples; trifunctional or more isocyanate such as triphenylmethane triisocyanate, 1-methylbenzole-2,4,6-triisocyanate, or dimethyl triphenylmethane tetraisocyanate; and the like, and these isocyanate compounds may be used in the form of a modified body such as carbodiimide-modified, isocyanurate-modified, or biuret-modified and also may be used in the form of a block isocyanate blocked with various blocking agents.

Examples of (a2) the polyol component include diol compounds having two hydroxyl groups in one molecule and polyol compounds having three or more hydroxyl groups in one molecule, and these may be used alone or in combination of two or more kinds thereof.

Examples of the diol compounds and polyol compounds having three or more hydroxyl groups in one molecule include low molecular weight polyols, polyether polyols, polyester polyols, polyester polycarbonate polyols, crystalline or noncrystalline polycarbonate polyols, polybutadiene polyol, and silicone polyol.

Examples of the low molecular weight polyols include aliphatic diols such as ethylene glycol, 1,2-propanediol, 1,3-propanediol, 2-methyl-1,3-propanediol, 2-butyl-2-ethyl-1,3-propanediol, 1,4-butanediol, neopentyl glycol, 3-methyl-2,4-pentanediol, 2,4-pentanediol, 1,5-pentanediol, 3-methyl-1,5-pentanediol, 2-methyl-2,4-pentanediol, 2,4-diethyl-1,5-pentanediol, 1,6-hexanediol, 1,7-heptanediol, 3,5-heptanediol, 1,8-octanediol, 2-methyl-1,8-octanediol, 1,9-nonanediol, and 1,10-decanediol; alicyclic diols such as cyclohexanedimethanol and cyclohexanediol; and trihydric or higher polyols such as trimethylolethane, trimethylolpropane, hexitols, pentitols, glycerol, polyglycerol, pentaerythritol, dipentaerythritol, and tetramethylolpropane.

Examples of the polyether polyols include ethylene oxide adducts such as diethylene glycol, triethylene glycol, tetraethylene glycol, and polyethylene glycol; propylene oxide adducts such as dipropylene glycol, tripropylene glycol, tetrapropylene glycol, and polypropylene glycol; ethylene oxide and/or propylene oxide adducts of the low molecular weight polyols described above, polytetramethylene glycol, and the like.

The polyester polyols include a polyester polyol obtained by direct esterification and/or transesterification of a polyol such as the low molecular weight polyols provided above as examples with a polycarboxylic acid or its ester-forming derivative such as ester, anhydride, or halide and/or a lactone or a hydroxycarboxylic acid obtained by ring-opening hydrolysis of the lactone in an amount less than the stoichiometric amount of the polyol. Examples of the polycarboxylic acid or its ester-forming derivative include polycarboxylic acids, such as aliphatic dicarboxylic acids such as oxalic acid, malonic acid, succinic acid, glutaric acid, adipic acid, pimeric acid, suberic acid, azelaic acid, sebacic acid, dodecanedioic acid, 2-methylsuccinic acid, 2-methyladipic acid, 3-methyladipic acid, 3-methylpentanedioic acid, 2-methyloctanedioic acid, 3,8-dimethyldecanedioic acid, 3,7-dimethyldecanedioic acid, hydrogenated dimer acid, and dimer acid; aromatic dicarboxylic acids such as phthalic acid, terephthalic acid, isophthalic acid, and naphthalenedicarboxylic acid; alicyclic dicarboxylic acids such as cyclohexanedicarboxylic acid; tricarboxylic acids such as trimellitic acid, trimesic acid, and trimer of castor oil fatty acid; and tetracarboxylic acids such as pyromellitic acid, and examples of the ester-forming derivative include acid anhydrides of these polycarboxylic acids; halides such as chlorides and bromides of the polycarboxylic acids; and lower aliphatic esters such as methyl, ethyl, propyl, isopropyl, butyl, isobutyl, and amyl esters of the polycarboxylic acids. Further, examples of the lactones include lactones such as γ-caprolactone, δ-caprolactone, ε-caprolactone, dimethyl-ε-caprolactone, δ-valerolactone, γ-valerolactone, and γ-butyrolactone.

Examples of (a3) the ionic group-introducing component, which is used as necessary, include substances capable of introducing an anionic group and substances capable of introducing a cationic group. Examples of the substances capable of introducing an anionic group include polyols containing a carboxyl group, such as dimethylolpropionic acid, dimethylolbutanoic acid, dimethylolbutyric acid, and dimethylolvaleric acid, and polyols containing a sulfonic acid group, such as 1,4-butanediol-2-sulfonic acid, and examples of the substances capable of introducing a cationic group include N,N-dialkylalkanolamines, N-alkyl-N,N-dialkanolamines such as N-methyl-N,N-diethanolamine and N-butyl-N,N-diethanolamine, and trialkanolamines.

As (a4) the ionic group-neutralizing agent component, which is used as necessary, examples of anionic group neutralizers include tertiary amine compounds such as trialkylamines (such as trimethylamine, triethylamine, and tributylamine), N,N-dialkylalkanolamines (such as N,N-dimethylethanolamine, N,N-dimethyl propanolamine, N,N-dipropylethanolamine, and 1-dimethylamino-2-methyl-2-propanol), N-alkyl-N,N-dialkanolamines, and trialkanolamines (such as triethanolamine); and basic compounds such as ammonia, trimethylammonium hydroxide, sodium hydroxide, potassium hydroxide, and lithium hydroxide, and examples of cationic group neutralizers include organic carboxylic acids such as formic acid, acetic acid, lactic acid, succinic acid, glutaric acid, and citric acid; organosulfonic acids such as paratoluene sulfonic acid and alkyl sulfonates; inorganic acids such as hydrochloric acid, phosphoric acid, nitric acid, and sulfonic acid; epoxy compounds such as epihalohydrin; and quaternizing agents such as dialkyl sulfates and alkyl halides.

As (a5) the chain extending agent component which is used as necessary, one or two or more kinds of commonly known chain extending agents can be used, and polyamine compounds, polyhydric primary alcohol compounds, and the like are preferred, and polyamine compounds are more preferred. Examples of the polyamine compounds include low molecular weight diamines resulting from the substitution of an alcoholic hydroxyl group in the low molecular weight diols provided as examples with an amino group, such as ethylenediamine and propylenediamine; polyetherdiamines such as polyoxypropylenediamine and polyoxyethylenediamine; alicyclic diamines such as menthenediamine, isophoronediamine, norbornenediamine, bis(4-amino-3-methyldicyclohexyl)methane, diaminodicyclohexylmethane, bis(aminomethyl)cyclohexane, and 3,9-bis(3-aminopropyl)2,4,8,10-tetraoxaspiro(5,5)undecane; aromatic diamines such as m-xylenediamine, α-(m/p aminophenyl)ethylamine, m-phenylenediamine, diaminodiphenylmethane, diaminodiphenylsulfone, diaminodiethyldimethyldiphenylmethane, diaminodiethyldiphenylmethane, dimethylthiotoluenediamine, diethyltoluenediamine, and α,α'-bis(4-aminophenyl)-p-diisopropylbenzene; hydrazine; and dicarboxylic acid dihydrazide compounds, which are compounds formed of hydrazine and dicarboxylic acids provided as examples of the polycarboxylic acid to be used for the above-described polyester polyols.

Among the respective components described above, as (a1) the polyisocyanate component, a diisocyanate compound is preferably used, 4,4'-diphenylmethane diisocyanate (MDI), 2,4'-diphenylmethane diisocyanate, 4,4'-dicyclohexylmethanediisocyanate, 1,4-cyclohexyldiisocyanate, 2,4-toluene diisocyanate, 1,6-hexamethylene diisocyanate, or the like is particularly preferably used, and 4,4'-diphenylmethane diisocyanate (MDI) is most preferably used. Further, as (a2) the polyol component, it is preferable that ethylene oxide adducts, which are diol compounds, are necessarily used, and it is particularly preferable that polyethylene glycol is necessarily used. Since polyethylene glycol is excellent in lithium ion conductivity, with such a configuration, the effect of lowering (inhibiting an increase in) the internal resistance of the battery may be significantly exhibited. Herein, the number average molecular weight of polyethylene glycol as calculated from a hydroxyl value is not particularly limited, but is preferably 2,500 to 15,000, more preferably 3,000 to 13,000, and further preferably 3,500 to 10,000. Incidentally, from the viewpoint of having excellent heat resistance, in addition to the essential components described above, it is preferable to further use ethylene glycol and/or glycerol as a polyol component. In particular, when only ethylene glycol is concurrently used without using glycerol, a gel obtained by swelling of the coating resin becomes a physically cross-linked gel, and thus can be dissolved in a solvent at the time of production and various producing methods as described later can be applied. On the other hand, when glycerol is also concurrently used in addition to ethylene glycol, the main chains of the polyurethane resin are chemically cross-linked to each other, and in this case, there is an advantage that the swelling degree to an electrolyte solution can be arbitrarily controlled by controlling the molecular weight between crosslinks.

Incidentally, the synthesis method of the polyurethane resin is not particularly limited, and appropriate reference can be made to the conventionally known knowledge.

(B) Polyvinyl-Based Resin

Since the polyvinyl-based resin has high flexibility (a large tensile elongation at break described later), when the polyvinyl-based resin is used as the coating resin, it is possible to alleviate the volume change of the active material in accordance with the charge and discharge reaction and suppress expansion of the active material layer.

The specific form of the polyvinyl-based resin is not particularly limited, and reference can be made to the conventionally known knowledge as long as it is a polymer obtained by polymerizing monomers including a monomer having a polymerizable unsaturated bond (hereinafter, also referred to as "vinyl monomer").

In particular, it is preferable to include, as a vinyl monomer, (b1) a vinyl monomer having a carboxyl group and (b2) a vinyl monomer represented by the following General Formula (1).

[Chem. 2]

$$CH_2=C(R^1)COOR^2 \qquad (1)$$

In the formula (1), $R^1$ is a hydrogen atom or a methyl group, and $R^2$ is linear alkyl group having 1 to 4 carbon atoms or a branched alkyl group having 4 to 36 carbon atoms.

Examples of (b1) the vinyl monomer having a carboxyl group include monocarboxylic acids having 3 to 15 carbon atoms such as (meth)acrylic acid, crotonic acid, and cinnamic acid; dicarboxylic acids having 4 to 24 carbon atoms such as maleic acid (anhydride), fumaric acid, itaconic acid (anhydride), citraconic acid, and mesaconic acid; trivalent to tetravalent, or higher polycarboxylic acids having 6 to 24 carbon atoms such as aconitic acid; and the like. Among these, (meth)acrylic acid is preferred and methacrylic acid is particularly preferred.

In (b2) the vinyl monomer represented by the above General Formula (1), $R^1$ represents a hydrogen atom or a methyl group. $R^1$ is preferably a methyl group.

$R^2$ is a linear alkyl group having 1 to 4 carbon atoms or a branched alkyl group having 4 to 36 carbon atoms, and specific examples of $R^2$ include a methyl group, an ethyl group, a propyl group, a 1-alkyl alkyl group (a 1-methylpropyl group (sec-butyl group), a 1,1-dimethylethyl group (tert-butyl group), a 1-methylbutyl group, a 1-ethylpropyl group, a 1,1-dimethyl propyl group, a 1-methylpentyl group, a 1-ethylbutyl group, a 1-methylhexyl group, a 1-ethyl pentyl group, a 1-methyl heptyl group, a 1-ethylhexyl group, a 1-methyl octyl group, a 1-ethyl heptyl group, a 1-methyl nonyl group, a 1-ethyl octyl group, a 1-methyldecyl group, a 1-ethyl nonyl group, a 1-butyl eicosyl group, a 1-hexyl octadecyl group, a 1-octyl hexadecyl group, a 1-decyl tetradecyl group, a 1-undecyl tridecyl group, or the like), 2-alkyl alkyl group (a 2-methylpropyl group (iso-butyl group), a 2-methylbutyl group, a 2-ethylpropyl group, a 2,2-dimethyl propyl group, a 2-methylpentyl group, a 2-ethylbutyl group, a 2-methylhexyl group, a 2-ethyl pentyl group, a 2-methyl heptyl group, a 2-ethylhexyl group, a 2-methyl octyl group, a 2-ethyl heptyl group, a 2-methyl nonyl group, a 2-ethyl octyl group, a 2-methyldecyl group, a 2-ethyl nonyl group, a 2-hexyl octadecyl group, a 2-octyl hexadecyl group, a 2-decyl tetradecyl group, a 2-undecyl tridecyl group, a 2-dodecyl hexadecyl group, a 2-tridecyl pentadecyl group, a 2-decyl octadecyl group, a 2-tetradecyl octadecyl group, a 2-hexadecyl octadecyl group, a 2-tetradecyl eicosyl group, a 2-hexadecyl eicosyl group, or the like), 3 to 34-alkylalkyl groups (such as a 3-alkyl alkyl group, a 4-alkyl alkyl group, a 5-alkyl alkyl group, a 32-alkyl alkyl group, a 33-alkyl alkyl group, and a 34-alkyl alkyl group); mixed alkyl groups containing one or more branched alkyl groups such as alkyl residues of oxo alcohols produced corresponding to propylene oligomers (from heptamer to undecamer), ethylene/propylene (molar ratio of 16/1 to 1/11) oligomers, isobutylene oligomers (from heptamer to octamer), α-olefin (having 5 to 20 carbon atoms) oligomer (from tetramer to octamer), and the like; and the like.

Among these, from the viewpoint of liquid absorption of the electrolyte solution, a methyl group, an ethyl group, and a 2-alkyl alkyl group is preferred, and a 2-ethylhexyl group and a 2-decyl tetradecyl group are further preferred.

Further, in addition to (b1) the vinyl monomer having a carboxyl group and (b2) the vinyl monomer represented by the above General Formula (1), (b3) a copolymerizable vinyl monomer not containing active hydrogen may be included in the monomers constituting the polymer.

Examples of (b3) the copolymerizable vinyl monomer not containing active hydrogen include the following monomers (b31) to (b35).

(b31) Carbyl (Meth)Acrylates Formed from a Monool Having 1 to 20 Carbon Atoms and (Meth)Acrylic Acid Examples of the monool include (i) aliphatic monools [such as methanol, ethanol, n- and i-propyl alcohol, n-butyl alcohol, n-pentyl alcohol, n-octyl alcohol, nonyl alcohol, decyl alcohol, lauryl alcohol, tridecyl alcohol, myristyl alcohol, cetyl alcohol, and stearyl alcohol]; (ii) alicyclic monools [such as cyclohexyl alcohol]; (iii) araliphatic monools [such as benzyl alcohol]; and mixtures of two or more thereof.

(b32) Poly- (n=2 to 30) oxyalkylene (2 to 4 carbon atoms) alkyl (1 to 18 carbon atoms) ether (meth)acrylate [ethylene oxide (hereinafter abbreviated as "EO") 10 mol adduct (meth)acrylate of methanol, propylene oxide (hereinafter abbreviated as "PO") 10 mol adduct (meth)acrylate of methanol, or the like].

(b33) Nitrogen-Containing Vinyl Compounds (b33-1) Amide Group-Containing Vinyl Compounds (i) (Meth)acrylamide compounds having 3 to 30 carbon atoms, for example, N,N-dialkyl (1 to 6 carbon atoms) or diaralkyl (7 to 15 carbon atoms) (meth)acrylamide [N,N-dimethylacrylamide, N,N-dimethylacrylamide, or the like], diacetone acrylamide (ii) Other amide group-containing vinyl compounds having 4 to 20 carbon atoms than the (meth)acrylic amide compounds described above, for example, N-methyl-N-vinyl acetamide or cyclic amides (pyrrolidone compounds (6 to 13 carbon atoms, for example N-vinyl pyrrolidone or the like))

(b33-2) (Meth)Acrylate Compounds (i) Dialkyl (1 to 4 carbon atoms) amino alkyl (1 to 4 carbon atoms) (meth)acrylates [N,N-dimethylaminoethyl (meth)acrylate, N,N-diethylaminoethyl (meth)acrylate, t-butylaminoethyl (meth)acrylate, morpholineethyl (meth)acrylate, or the like]

(ii) Quaternary ammonium group-containing (meth)acrylates [quaternary compounds obtained by quaternizing tertiary amino group-containing (meth)acrylates [such as N,N-dimethylaminoethyl (meth)acrylate and N,N-diethylaminoethyl (meth)acrylate] (quaternary product obtained by using the quaternizing agent), or the like]

(b33-3) Heterocyclic Ring-Containing Vinyl Compounds

Pyridine compounds (7 to 14 carbon atoms, for example 2- and 4-vinyl pyridine), imidazole compounds (5 to 12 carbon atoms, for example N-vinyl imidazole), pyrrole compounds (6 to 13 carbon atoms, for example N-vinyl pyrrole), and pyrrolidone compounds (6 to 13 carbon atoms, for example N-vinyl-2-pyrrolidone)

(b33-4) Nitrile Group-Containing Vinyl Compounds

Nitrile group-containing vinyl compounds having 3 to 15 carbon atoms, for example, (meth)acrylonitrile, cyanostyrene, and cyanoalkyl (1 to 4 carbon atoms) acrylate (b33-5) Other Vinyl Compounds Nitro group-containing vinyl compounds (8 to 16 carbon atoms, for example nitrostyrene), or the like (b34) Vinyl Hydrocarbons (b34-1) Aliphatic Vinyl Hydrocarbons Olefins having 2 to 18 or more carbon atoms [ethylene, propylene, butene, isobutylene, pentene, heptene, di-isobutylene, octene, dodecene, octadecene, and the like], dienes having 4 to 10 or more carbon atoms [butadiene, isoprene, 1,4-pentadiene, 1,5-hexadiene, 1,7-octadiene, and the like], or the like (b34-2) Alicyclic Vinyl Hydrocarbons Unsaturated cyclic compounds having 4 to 18 or more carbon atoms, for example cycloalkenes (for example, cyclohexene), (di)cycloalkadienes [for example, (di)cyclopentadiene], and terpenes (for example, pinene, limonene, and indene)

(b34-3) Aromatic Vinyl Hydrocarbons

Unsaturated aromatic compounds having 8 to 20 or more carbon atoms, for example, styrene, α-methylstyrene, vinyltoluene, 2,4-dimethylstyrene, ethylstyrene, isopropylstyrene, butylstyrene, phenylstyrene, cyclohexylstyrene, and benzylstyrene (b35) Vinyl Esters, Vinyl Ethers, Vinyl Ketones, and Unsaturated Dicarboxylic Acid Diesters (b35-1) Vinyl Esters Aliphatic vinyl esters [4 to 15 carbon atoms, for example, alkenyl esters of aliphatic carboxylic acids (mono- and di-carboxylic acids) (for example, vinyl acetate, vinyl propionate, vinyl butyrate, diallyl adipate, isopropenyl acetate, and vinyl methoxy acetate)], aromatic vinyl esters [9 to 20 carbon atoms, for example, alkenyl esters of aromatic carboxylic acids (mono- and di-carboxylic acids) (for example, vinyl benzoate, diallyl phthalate, and methyl-4-vinyl benzoate), and aromatic ring-containing esters of aliphatic carboxylic acids (for example, acetoxy styrene)]

(b35-2) Vinyl Ethers

Aliphatic vinyl ethers [3 to 15 carbon atoms, for example, vinyl alkyl (1 to 10 carbon atoms) ethers [vinyl methyl ether, vinyl butyl ether, vinyl 2-ethylhexyl ether, or the like], vinylalkoxy (1 to 6 carbon atoms) alkyl (1 to 4 carbon atoms) ethers [vinyl-2-methoxy ethyl ether, methoxybutadiene, 3,4-dihydro-1,2-pyran, 2-butoxy-2'-vinyloxy diethyl ether, vinyl-2-ethylmercapto ethyl ether, or the like], and poly (2 to 4) (meth)allyloxy alkanes (2 to 6 carbon atoms) [diallyloxyethane, triallyloxyethane, tetraallyloxybutane, tetramethallyloxyethane, or the like]]

Aromatic vinyl ethers (8 to 20 carbon atoms, for example, vinyl phenyl ether or phenoxystyrene)

(b35-3) Vinyl Ketones

Aliphatic vinyl ketones (4 to 25 carbon atoms, for example, vinyl methyl ketone or vinyl ethyl ketone)

Aromatic vinyl ketones (9 to 21 carbon atoms, for example, vinyl phenyl ketone)

(b35-4) Unsaturated Dicarboxylic Acid Diesters

Unsaturated dicarboxylic diesters having 4 to 34 carbon atoms, for example, dialkyl fumarate (two alkyl groups are straight chain, branched chain, or alicyclic groups having 1 to 22 carbon atoms), dialkyl maleates (two alkyl groups are straight chain, branched chain, or alicyclic groups having 1 to 22 carbon atoms)

From the viewpoint of absorption of the electrolyte solution and the voltage resistance, among those exemplified in (b3) above, (b31), (b32), and (b33) are preferred, and methyl (meth)acrylate, ethyl (meth)acrylate, and butyl (meth)acrylate in (b31) are further preferred.

In the polymer, with regard to the content of (b1) the vinyl monomer having a carboxyl group, (b2) the vinyl monomer represented by the above General Formula (1), and (b3) the copolymerizable vinyl monomer not containing active hydrogen, it is preferable that the content of (b1) is 0.1 to 80% by mass, the content of (b2) is 0.1 to 99.9% by mass, and the content of (b3) is 0 to 99.8% by mass, based on the mass of the polymer.

When the content of the monomers is in the above ranges, liquid-absorbing property for the electrolyte solution becomes favorable.

More preferred content is 30 to 60% by mass for (b1), 5 to 60% by mass for (b2), and 5 to 80% by mass for (b3), and further preferred content is 35 to 50% by mass for (b1), 15 to 45% by mass for (b2), and 20 to 60% by mass for (b3).

The lower limit of the number average molecular weight of the polymer is preferably 10,000, further preferably 15,000, particularly preferably 20,000, and most preferably 30,000, and the upper limit thereof is preferably 2,000,000, further preferably 1,500,000, particularly preferably 1,000,000, and most preferably 800,000.

The number average molecular weight of the polymer can be measured by GPC (gel permeation chromatography) under the following conditions.

Apparatus: Alliance GPC V2000 (manufactured by Waters Co. Ltd.)
Solvent: orthodichlorobenzene
Standard substance: polystyrene
Sample concentration: 3 mg/ml
Column stationary phase: PL gel 10 μm, two MIXED-B in series (manufactured by Polymer Laboratories Ltd.)
Column temperature: 135° C.

The solubility parameter (SP value) of the polymer is preferably 9.0 to 20.0 $(cal/cm^3)^{1/2}$. The SP value of the polymer is more preferably 9.5 to 18.0 $(cal/cm^3)^{1/2}$ and further preferably 10.0 to 14.0 $(cal/cm^3)^{1/2}$. The polymer having an SP value of 9.0 to 20.0 $(cal/cm^3)^{1/2}$ is preferred in terms of liquid absorption of the electrolyte solution.

Further, the glass transition point [hereinafter, abbreviated as Tg, measurement method: DSC (differential scanning calorimetry)] of the polymer is preferably 80 to 200° C., further preferably 90 to 190° C., and particularly preferably 100 to 180° C., from the viewpoint of heat resistance of the battery.

The polymer can be produced by a known polymerization method (such as bulk polymerization, solution polymerization, emulsion polymerization, or suspension polymerization).

The coating resin preferably has proper flexibility in a state of being immersed in the electrolyte solution. Specifically, the tensile elongation at break of the coating resin in a saturated liquid absorption state is preferably 10% or more, more preferably 20% or more, further preferably 30% or more, particularly preferably 40% or more, and most preferably 50% or more. When the electrode active material is coated using a resin having a tensile elongation at break of 10% or more, it is possible to alleviate the volume change of the electrode active material caused by the charge and discharge reaction and suppress expansion of the electrode. Incidentally, in the present specification, the "tensile elongation at break" is an index indicating the flexibility of the resin, and is a value obtained by a measurement method described in the section of Examples described later. A larger value of the tensile elongation at break of the coating resin is preferred, and the upper limit value thereof is not particularly limited, but is usually 400% or less and preferably 300% or less. That is, a preferred numerical range of the tensile elongation at break is 10 to 400%, 20 to 400%, 30 to 400%, 40 to 400%, 50 to 400%, 10 to 300%, 20 to 300%, 30 to 300%, 40 to 300%, or 50 to 300%.

As a means for providing flexibility to the coating resin and controlling the tensile elongation at break to a desired value, a method of introducing a partial structure having flexibility (for example, a long-chain alkyl group, a polyether residue, an alkyl polycarbonate residue, an alkyl polyester residue, or the like) to the main chain of the coating resin is exemplified. Further, it is also possible to provide flexibility to the coating resin and control the tensile elongation at break by a means for controlling the molecular weight of the coating resin or controlling the molecular weight between crosslinks.

(Conductive Aid)

The conductive aid forms an electron conduction path in the coating agent and reduces electron movement resistance of the electrode active material layer, and thus may contribute to an improvement in output characteristics at a high rate of the battery.

Examples of the conductive aid include metals such as aluminum, stainless steel (SUS), silver, gold, copper, and titanium, alloys containing these metals, or metal oxide; and carbon such as graphite, carbon fiber (specifically, vapor-phase growth carbon fiber (VGCF) or the like), carbon nanotube (CNT), carbon black (specifically, acetylene black, Ketjen black (registered trademark), furnace black, channel black, thermal lamp black, or the like), but the conductive aid is not limited thereto. Further, those which are obtained by coating the above-described metal materials around a particulate ceramic material or resin material by plating or the like can be used as the conductive aid. Among these conductive aids, from the viewpoint of electrical stability, it is preferable to include at least one selected from the group consisting of aluminum, stainless steel, silver, gold, copper, titanium, and carbon, it is more preferable to include at least one selected from the group consisting of aluminum, stainless steel, silver, gold, and carbon, and it is further preferable to include at least one kind of carbon. These conductive aids may be used alone or in combination of two or more kinds thereof.

The shape of the conductive aid is preferably particulate or fibrous. In a case where the conductive aid is particulate, the shape of the particle is not particularly limited, but may be any shapes such as powdery, spherical, rod-like, needle-like, plate-like, columnar, irregular, scaly, and spindle-like shapes.

The average particle diameter (primary particle diameter) in a case where the conductive aid is particulate is not particularly limited, but is preferably about 0.01 to 10 μm from the viewpoint of electrical characteristics of the battery. Incidentally, in the present specification, the "particle diameter" means the maximum distance L among the distances between any two points on a contour of the conductive aid. As a value of the "average particle diameter," values that are determined by using an observation means such as a scanning electron microscope (SEM) or a transmission electron microscope (TEM) calculating the average value of particle diameter of particles that are observed from several to several tens of fields of view are employed.

The content of the coating resin and the conductive aid in the coating agent is not particularly limited, but is preferably the coating resin (resin solid content): the conductive aid=1:0.2 to 3.0 (mass ratio). With such a range, the conductive aid can favorably form an electron conduction path in the coating agent.

(Method for Producing Coated Electrode Active Material)

The method for producing a coated electrode active material is not particularly limited, but for example, the following method is exemplified. First, a solution containing a coating resin and a solvent (resin solution for coating) is added dropwise over 1 to 90 minutes to the condition where an electrode active material is put in a universal mixer and being stirred at 10 to 500 rpm. As the solvent at this time, alcohols such as methanol, ethanol, and isopropanol can be suitably used. Thereafter, a conductive aid is further added and mixed. Then, the temperature is increased to 50 to 200° C. under stirring, and the pressure is lowered to 0.007 to 0.04 MPa followed by maintaining it for 10 to 150 minutes, so that a coated electrode active material can be obtained.

(Conductive Member)

In this embodiment, the conductive member has a function of forming an electron conduction path in the electrode active material layer. In particular, it is preferable that at least a part of the conductive member forms a conduction path electrically connecting two principal surfaces of the electrode active material layer (in the present embodiment, forms a conduction path electrically connecting a first principal surface coming into contact with the electrolyte layer side of the electrode active material layer and a second principal surface coming into contact with the current collector side). With such an embodiment, the electron movement resistance in the thickness direction in the electrode active material layer is further reduced, and thus output characteristics at a high rate of the battery can be further improved. Incidentally, whether or not at least a part of the conductive member forms a conduction path electrically connecting two principal surfaces of the electrode active material layer (in the present embodiment, forms a conduction path electrically connecting a first principal surface coming into contact with the electrolyte layer side of the electrode active material layer and a second principal surface coming into contact with the current collector side) can be confirmed by observing a cross-section of the electrode active material layer using an SEM or an optical microscope.

The conductive member is preferably a conductive fiber having a fibrous form. Specific examples thereof include carbon fiber such as PAN carbon fiber and pitch carbon fiber, conductive fiber containing a highly conductive metal or graphite uniformly dispersed in synthetic fiber, metal fiber obtained by converting metals such as stainless steel into fiber, conductive fiber containing organic fiber whose surface is coated with a metal, conductive fiber containing organic fiber whose surface is coated with a resin containing a conductive substance, and the like. Among them, carbon fiber is preferred since it is excellent in conductivity and lightweight.

The content of the conductive member in the negative active material layer is preferably 1 to 20% by mass and more preferably 2 to 15% by mass with respect to 100% by mass of the total solid content amount (the total of the solid content amount of the whole member) of the negative active material layer. When the content of the conductive member is in the above range, it is possible to favorably form an electron conduction path in the electrode active material layer and suppress a decrease in energy density of the battery.

(Ion Conductive Polymer)

Examples of the ion conductive polymer include polyethylene oxide (PEO)-based and polypropylene oxide (PPO)-based polymers.

(Lithium Salt)

Examples of the lithium salt (supporting salt) include lithium salts of inorganic acids such as $LiPF_6$, $LiBF_4$, $LiSbF_6$, $LiAsF_6 LiClO_4$, and $Li[(FSO_2)_2N](LiFSI)$, lithium salts (ionic liquids) of organic acids such as $LiN(CF_3SO_2)_2$, $LiN(C_2F_5SO_2)_2$, and $LiC(CF_3SO_2)_3$, and the like. Among them, from the viewpoint of battery output and charge-discharge cycle characteristics, $LiPF_6$ or $Li[(FSO_2)_2N]$ (LiFSI) is preferred.

Incidentally, in the bipolar type secondary battery of this embodiment, as constitutional members of the electrode active material layer, members other than the electrode active material and the coating agent (coating resin, conductive aid) described above and the conductive member, the ion conductive polymer, and the lithium salt which are used as necessary may be appropriately used. However, from the viewpoint of the improving the energy density of the battery, it is preferable that a member which does almost not contribute to proceeding of the charge and discharge reaction is not contained. Herein, in the bipolar type secondary battery according to this embodiment, the electrode active material layers (the positive electrode active material layer and the negative electrode active material layer) are preferably a so-called "non-bound body" in which the electrode active materials (the positive electrode active material and the negative electrode active material) are not bound by a binder crystallized by heating. Further, in order to make the electrode active material layer a non-bound body, it is preferable not to use a binder, which is added for binding electrode active material particles and other members and maintaining the structure of the electrode active material layer, as much as possible. That is, the content of the binder in the electrode active material layer is preferably 10% by mass or less, more preferably 5% by mass or less, further preferably 2% by mass or less, particularly preferably 1% by mass or less, and most preferably 0% by mass with respect to 100% by mass of the total solid content amount contained in the electrode active material layer. Incidentally, in a case where a binder is contained in the electrode active material layer, the binder is preferably formed by a material having small flexibility from the viewpoint of maintaining the structure of the electrode active material layer. Specifically, the tensile elongation at break of the binder in a saturated liquid absorption state is preferably less than 10%, more preferably 7% or less, further preferably 5% or less, particularly preferably 3% or less, and most preferably 1% or less.

In the bipolar type secondary battery of this embodiment, regarding the thickness of the electrode active material layer, the thickness of the positive electrode active material layer is preferably 150 to 1500 μm, more preferably 180 to 950 μm, and further preferably 200 to 800 μm. Further, the thickness of the negative electrode active material layer is preferably 150 to 1500 μm, more preferably 180 to 1200 μm, and further preferably 200 to 1000 μm. When the thickness of the electrode active material layer is a value equal to or more than the lower limit value, the energy density of the battery can be sufficiently increased. On the other hand, when the thickness of the electrode active material layer is a value equal to or less than the upper limit value, the structure of the electrode active material layer can be sufficiently maintained.

Regarding the porosity of the electrode active material layer, the porosity of the positive electrode active material layer is preferably 35.0 to 50.0%, more preferably 40.0 to 49.5%, further preferably 42.0 to 49.0%. Further, the porosity of the negative electrode active material layer is preferably 39.0 to 60.0%, more preferably 39.5 to 55.0%, and further preferably 40.0 to 50.0%. When the porosity of the electrode active material layer is a value equal to or more than the lower limit value, the pressing pressure at the time of pressing the coating film after a slurry for an electrode active material layer is applied at the time of forming the electrode active material layer is not necessary to be increased. As a result, an electrode active material layer having a desired thickness and a desired area can be suitably formed. On the other hand, when the porosity of the electrode active material layer is a value equal to or less than the upper limit value, contact between electron conductive materials (such as a conductive aid, an electrode active material, and a conductive member) adjacent to each other in the electrode active material layer can be sufficiently maintained, and an increase in electron movement resistance can be prevented. As a result, the charge and discharge reaction can uniformly proceed in the entire electrode active material layer (particularly in a thickness direction), and a decrease in output characteristics (particularly, output characteristics at a high rate) of the battery can be prevented. Incidentally, in the present specification, the porosity of the electrode active material layer may be measured by the following method. A value measured by another method may be used as long as the same value is obtained.

(Method of Measuring Porosity of Electrode Active Material Layer)

The porosity of the electrode active material layer is calculated according to the following Equation (1). Incidentally, an electrolyte solution may be present in a part inside the pores.

Porosity (%)=100−Solid content occupied volume ratio (%) of the electrode active material layer    Equation (1):

Herein, the "solid content occupied volume ratio (%)" of the electrode active material layer is calculated by the following Equation (2).

Solid content occupied volume ratio (%)=(Solid material volume (cm$^3$)/Electrode active material layer volume (cm$^3$))×100    Equation (2):

Incidentally, the electrode active material layer volume is calculated from the thickness of the electrode and the coated area. Further, the solid material volume is obtained by the following procedures.

(a) The added amounts of respective materials contained in a slurry for an electrode active material layer are weighed.

(b) After the slurry for an electrode active material layer is applied onto the surface of the current collector, the weights of the current collector and the coating film are weighed.

(c) The slurry after application is pressed and the weights of the current collector and the coating film after pressing are weighed.

(d) The amount of the electrolyte solution suctioned out at the time of pressing is calculated from "the value obtained in (c)−the value obtained in (b)."

(e) The masses of respective materials in the electrode active material layer after pressing are calculated from the values of (a), (c), and (d).

(f) The volumes of respective materials in the electrode active material layer are calculated from the masses of respective materials calculated in (e) and the densities of respective materials.

(g) The solid material volume is calculated by summing only the volumes of the solid materials among the volumes of respective materials calculated in (f).

Further, regarding the density of the electrode active material layer, the density of the positive electrode active material layer is preferably 2.10 to 3.00 g/cm$^3$, more preferably 2.15 to 2.70 g/cm$^3$, further preferably 2.17 to 2.60 g/cm$^3$. Further, the density of the negative electrode active material layer is preferably 0.60 to 1.20 g/cm$^3$, more preferably 0.70 to 1.00 g/cm$^3$, and further preferably 0.80 to 0.91 g/cm$^3$. When the density of the electrode active material layer is a value equal to or more than the lower limit value, a battery having a sufficient energy density can be obtained. On the other hand, when the density of the electrode active material layer is a value equal to or less than the upper limit value, a decrease in porosity of the negative electrode active material layer can be prevented. When a decrease in porosity is suppressed, an electrolyte solution filled in pores is sufficiently secured, and an increase in ion movement resistance in the negative electrode active material layer can be prevented. As a result, a decrease in output characteristics (particularly, output characteristics at a high rate) of the battery can also be suppressed. Incidentally, in the present specification, the density of the negative electrode active material layer may be measured by the following method. A value measured by another method may be used as long as the same value is obtained.

(Method of Measuring Density of Active Material Layer)

The density of the active material layer is calculated according to the following Equation (3).

Electrode density (g/cm$^3$)=Solid material mass (g)÷Electrode volume (cm$^3$)    Equation (3):

Incidentally, the solid material mass is calculated by summing only the masses of the solid materials among the masses of respective materials in the electrode after pressing obtained in (e). The electrode volume is calculated from the thickness of the electrode and the coated area.

<Method for Producing Electrode>

An aspect of the present invention relates to a method for producing a battery electrode. According to the method for producing a battery electrode according to this aspect, a battery electrode, which has a current collector and an electrode active material layer disposed on the surface of the current collector and containing an electrode active material, is produced. The battery electrode produced in this way can be used, for example, as an electrode of a non-aqueous electrolyte secondary battery such as a bipolar type battery according to the embodiment described above.

The method for producing an electrode according to this aspect essentially includes a step of coating an electrode active material slurry, in which the electrode active material is dispersed in a solvent, on the surface of the current collector to form an electrode active material layer (coating step).

Herein, the method for producing an electrode according to this aspect has a feature in combination of flow characteristics of a coating liquid and the coating rate in the coating step. According to the method for producing a battery electrode according to an aspect of the present invention, an electrode active material layer with improved flatness of the surface can be formed without increasing the amount of the binder added. Therefore, the present invention is effective in both an increase in energy density of the battery and battery characteristics such as cycle durability.

Hereinafter, the method for producing a battery electrode according to this aspect including the aforementioned features will be described in detail.

(Electrode Active Material Slurry)

The electrode active material slurry is a mixture essentially containing an electrode active material and a solvent, and is generally a dispersion liquid obtained by dispersing the solid content containing an electrode active material in a solvent. Herein, regarding the specific configuration (such as type or content) of the solid content (such as a (coated) electrode active material, a conductive member, an ion conductive polymer, or a lithium salt) contained in the electrode active material slurry, the same configuration as described in the section of the embodiment of the bipolar type secondary battery described above may be employed, and thus the detailed description will be omitted herein. Further, as necessary, a small amount of a binder may be added to the coating liquid. However, as described above, the content of the binder is preferably 10% by mass or less, more preferably 5% by mass or less, further preferably 2% by mass or less, particularly preferably 1% by mass or less, and most preferably 0% by mass with respect to 100% by mass of the total solid content amount contained in the electrode active material layer.

The solvent constituting the electrode active material slurry is not particularly limited, and for example, an organic solvent constituting a liquid electrolyte (electrolyte solution) in a non-aqueous electrolyte secondary battery of the related art may be preferably used. Examples of an organic solvent which may be used for a solvent constituting the coating liquid include carbonates such as ethylene carbonate (EC), propylene carbonate (PC), dimethyl carbonate (DMC), diethyl carbonate (DEC), and ethyl methyl carbonate. Further, a liquid electrolyte (electrolyte solution) constituting a battery may be used as the solvent of the electrode active material slurry in this step without any changes. According to such a configuration, the producing process is significantly simplified, and at this time, in addition to the organic solvent, any solid contents (for example, the lithium salt or various additives to be added to the electrolyte solution) are contained in the coating liquid. Incidentally, as the liquid electrolyte (electrolyte solution), a liquid electrolyte having the same composition as or different composition from the liquid electrolyte (electrolyte solution) contained in the electrolyte layer of the battery may be used. From the viewpoint of simplification of the production process by eliminating a drying step, it is preferable to have the same composition.

As the lithium salt, the aforementioned examples can be similarly used. Further, examples of the additive include vinylene carbonate, methylvinylene carbonate, dimethylvinylene carbonate, phenylvinylene carbonate, diphenylvinylene carbonate, ethylvinylene carbonate, diethylvinylene carbonate, vinylethylene carbonate, 1,2-divinylethylene carbonate, 1-methyl-1-vinylethylene carbonate, 1-methyl-2-vinylethylene carbonate, 1-ethyl-1-vinylethylene carbonate, 1-ethyl-2-vinylethylene carbonate, vinylvinylene carbonate, allylethylene carbonate, vinyloxymethylethylene carbonate, allyloxymethylethylene carbonate, acryloxymethylethylene carbonate, methacryloxymethylethylene carbonate, ethynylethylene carbonate, propargylethylene carbonate, ethynyloxymethylethylene carbonate, propargyloxyethylene carbonate, methylene ethylene carbonate, 1,1-dimethyl-2-methylene ethylene carbonate, and the like. Among them, vinylene carbonate, methylvinylene carbonate, and vinylethylene carbonate are preferred, and vinylene carbonate and vinylethylene carbonate are more preferred. These cyclic carbonate esters may be used alone or in combination of two or more kinds thereof.

As described above, the electrode active material slurry to be used in this step has a feature in the flow characteristics. Specifically, the electrode active material slurry to be used in this step has the following flow characteristics in the shear rate (horizontal axis)-shear stress (vertical axis) curve of the electrode active material slurry.

"A region A in which a shear stress is not increased according to an increase in shear rate is present and a region B in which a shear stress is increased and an increase rate thereof is decreased according to an increase in shear rate is present in a region having a shear rate larger than that of the region A."

Incidentally, the inclination of the tangent line at a point on the shear rate-shear stress curve corresponds to the viscosity of the electrode active material slurry at the shear rate. Therefore, a small change in shear stress means that the inclination of the tangent line (that is, a change in viscosity) is also small. In other words, the electrode active material slurry can have flow characteristics that the viscosity is not almost changed for a while according to an increase in shear rate, and the viscosity is increased based on a point as a boundary and then the viscosity is decreased again.

Figure 2:
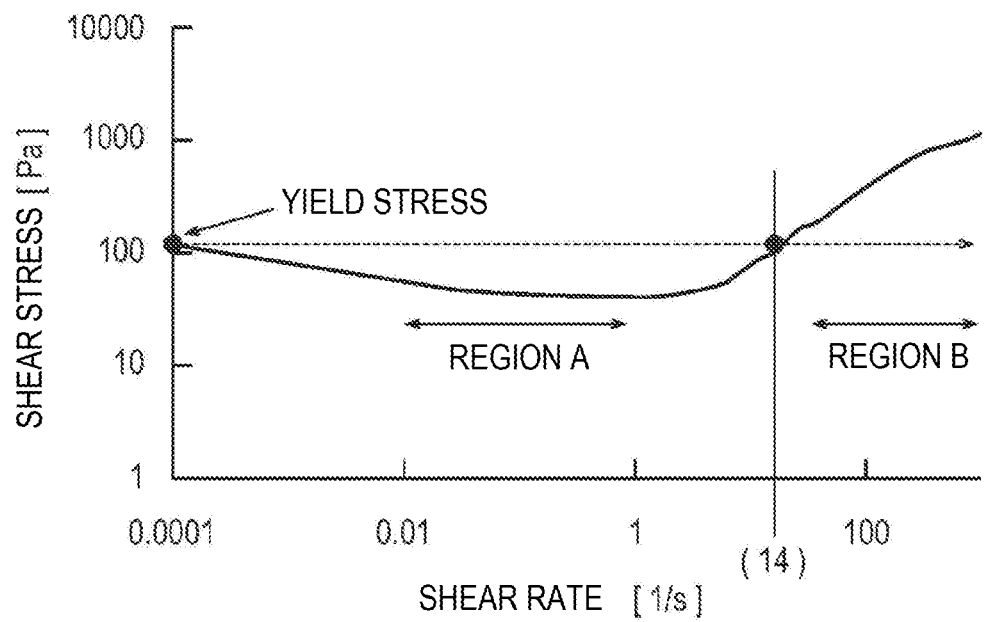
FIG. 2 is a graph showing a shear rate (horizontal axis)-shear stress (vertical axis) curve obtained by measuring a shear stress of a slurry for a negative electrode active material layer prepared in the section of Examples described later in a shear rate range of 0.01 to 1000 [l/s], using AR-200 rheometer manufactured by TA Instruments.

FIG. 2 is a shear rate (horizontal axis)-shear stress (vertical axis) curve of the electrode active material slurry showing the flow characteristics as described above (both the vertical axis and the horizontal axis are based on a logarithmic scale; also see Examples described later). Herein, whether or not the electrode active material slurry has such flow characteristics is determined based on a shear rate (horizontal axis)-shear stress (vertical axis) curve obtained by measuring a shear stress in a shear rate range of 0.01 to 1000 [l/s], using AR-200 rheometer manufactured by TA Instruments. Incidentally, regarding the detailed measurement conditions (a measurement jig and a measurement protocol), an embodiment described in the section of Examples described later is employed.

A method for preparing the electrode active material slurry showing the predetermined flow characteristics is not particularly limited. For example, it is possible to prepare the electrode active material slurry showing the predetermined flow characteristics by adjusting the solid content concentration in the electrode active material slurry containing an electrode active material and a solvent. Specifically, the solid content concentration of the electrode active material slurry according to this aspect is preferably 60% by mass or more, more preferably 62% by mass or more, further preferably 64% by mass or more, particularly preferably 66% by mass or more, and most preferably 68% by mass or more, in a case where the electrode active material slurry is used to form a positive electrode active material layer (that is, in a case where the electrode active material slurry is a positive electrode active material slurry). Further, the solid content concentration thereof is preferably 40% by mass or more, more preferably 42% by mass or more, further preferably 44% by mass or more, particularly preferably 46% by mass or more, and most preferably 48% by mass or more, in a case where the coating liquid is used to form a negative electrode active material layer (that is, in a case where the electrode active material slurry is a negative electrode active material slurry). Meanwhile, the upper limit value of the solid content concentration of the electrode active material slurry according to this aspect is also not particularly limited, but is preferably 80% by mass or less in a case where the electrode active material slurry is used to form a positive electrode active material layer (that is, in a case where the electrode active material slurry is a positive electrode active material slurry). Further, in a case where the electrode active material slurry is used to form the negative electrode active material layer (that is, in the case of the negative electrode active material slurry), the solid content concentration thereof is preferably 55% by mass or less. When the concentration is in the above range, an electrode active material layer having a sufficient thickness in the application step described later can be easily formed. In addition, adjustment of the porosity or the density is facilitated with a pressing treatment to be carried out as necessary. Furthermore, even at the same solid content concentration, the number of particles to be contained increases as the size of the particles contained in the solvent decreases. As a result, particles existing around an arbitrary particle existing in the solvent are also increased and the distance between particles is also decreased, so that the interaction between particles is increased and fluidity tends to decrease. Therefore, flow characteristics can be adjusted to the same as the flow characteristics in the case of using particles having different sizes by decreasing the aforementioned solid content concentration in a case where the size of particles is small.

Incidentally, it has been described that the method for producing a battery electrode according to this aspect has a feature in combination of flow characteristics of the electrode active material slurry and the coating rate in the coating step. However, according to another aspect of the present invention, it is also possible to provide an invention defining "the composition of the electrode active material slurry" instead of "the flow characteristics of the electrode active material slurry." Specifically, the "electrode active material slurry" according to another aspect of the present invention essentially contains electrode active material particles and a solvent, and the upper limit value of the solid content concentration and the upper limit value of the content of the binder are defined. Further, the electrode active material contained in this "electrode active material slurry" is preferably a coated electrode active material. Moreover, this "electrode active material slurry" preferably further contains at least one of a conductive member, an ion conductive polymer, and a lithium salt, and more preferably contains all of these components.

Herein, the method for preparing an electrode active material slurry by mixing respective components contained in the electrode active material slurry is not particularly limited, and regarding the addition order of members, the mixing method, and the like, appropriate reference can be made to the conventionally known knowledge. However, since the solid content concentration of the electrode active material slurry is relatively high, it is preferable to use a mixer capable of imparting high shear as a mixer for mixing the respective materials. Specifically, a planetary mixer, a kneader, a homogenizer, an ultrasonic homogenizer, or a blade-type stirrer such as a disperser is preferred, and in particular, a planetary mixer is particularly preferred from the viewpoint of performing stiff-kneading. Further, the specific mixing method is not also particularly limited, but it is preferable to prepare an electrode active material slurry by performing stiff-kneading at a higher solid content concentration than the final solid content concentration, and then adding a solvent component, followed by further mixing. Incidentally, the mixing time is not particularly limited and may be a time that enables uniform mixing to be achieved. For example, stiff-kneading and subsequent mixing may be performed for about 10 to 60 minutes, respectively, and each step may be performed at a time or may also be dividedly performed several times.

(Coating Step)

In the coating step, the aforementioned electrode active material slurry is coated on the surface of the current collector to form a coating film. Herein, as described above, the electrode active material slurry according to this aspect has the following flow characteristics in the shear rate (horizontal axis)-shear stress (vertical axis) curve of the electrode active material slurry as shown in FIG. 2.

"A region A in which a shear stress is not increased according to an increase in shear rate is present and a region B in which a shear stress is increased and an increase rate thereof is decreased according to an increase in shear rate is present in a region having a shear rate larger than that of the region A."

Alternatively, the electrode active material slurry according to another aspect of the present invention has a composition defined by the solid content concentration or the like described above.

Further, it is characterized in that coating of the electrode active material slurry is performed at a coating rate at which the shear rate at the time of coating is a value in which a shear stress equal to or more than a yield stress of the electrode active material slurry is applied in the coating step. Herein, the "yield stress" refers to a shear stress obtained as a value of the section when a value at the side of a small shear rate is extrapolated toward the vertical axis (the straight line of a shear rate of 0.0001 [l/s]), in a shear rate (horizontal axis)-shear stress (vertical axis) curve obtained by measuring a shear stress in a shear rate range of 0.01 to 1000 [l/s] as shown in FIG. 2. In the coating step of the method for producing a battery electrode according to this aspect, coating is performed at a coating rate at which a shear stress equal to or more than the yield stress is applied. Herein, in view of the flow characteristics of the electrode active material slurry, the value of the shear rate corresponding to the value of the yield stress obtained in this way exists in a region having a shear rate larger than that of the region A (shear rate=14 [l/s] shown in FIG. 2). Further, by setting the coating rate so that the shear rate equal to or more than the value of the shear rate (the value in which the shear stress corresponding to the yield stress of the electrode active material slurry is applied) is obtained (that is, so that the shear rate is 14 [l/s] or more), coating is performed so that the shear stress equal to or more than the yield stress is applied. Incidentally, the value of the shear rate at the time of coating is calculated by dividing the value of the coating rate [mm/s] by the thickness [mm] of the coating film obtained by coating. According to this, in the case shown in FIG. 2, when the thickness of the coating film is 500 [μm] (=0.5 [mm]), the shear rate can be adjusted to 14 [1/s] or more by setting the coating rate to (14×0.5=) 7 [mm/s] or more. The upper limit value of the shear rate at the time of coating is not particularly limited, and a larger value of the shear rate (that is, a larger coating rate) is preferable in industrial mass production. From such viewpoints, the lower limit value of the shear rate is preferably 10 [1/s] or more, more preferably 30 [1/s] or more, further preferably 100 [1/s] or more, still more preferably 300 [1/s] or more, particularly preferably 500 [1/s] or more, and most preferably 800 [1/s] or more. On the other hand, an example of the upper limit value of the shear rate is, for example, 1000 [1/s] or less.

The thickness of a coating film obtained by coating the electrode active material slurry in the coating step is not particularly limited, and the thickness may be appropriately set to achieve the thickness of the electrode active material layer described above.

A coating means for performing coating in the coating step is not also particularly limited, and a coating means capable of performing coating of the electrode active material slurry at a coating rate at which the shear rate at the time of coating is a value in which a shear stress equal to or more than the yield stress is applied may be appropriately used. In particular, a coating method with a slit die coater of performing coating by ejecting an electrode active material slurry from a slit is an example of suitable coating means since coating of a coating film and uniformity of coated thickness are excellent.

In the method for producing a battery electrode according to this aspect, it is preferable not to subject the obtained coating film to a dry treatment by heating after the coating film is obtained by coating the electrode active material slurry. In the case of not heating and drying after coating the electrode active material slurry in this way, it is difficult to cut an electrode into a desired area after coating the electrode active material slurry. Thus, in the method for producing a battery electrode according to this aspect, it is necessary to coat the electrode active material slurry on the surface of the current collector to have a desired area. For this reason, a masking treatment or the like may be performed to the surface of the current collector other than the coated portion in advance.

In the method for producing a battery electrode according to this aspect, the coating film obtained by coating the electrode active material slurry may be subjected to a pressing treatment. When this pressing treatment is performed, it is preferable that pressing is performed in a state where a porous sheet is disposed on the surface of the coating film. By performing such a pressing treatment, an electrode active material layer having higher surface uniformity is obtained. Incidentally, the porous sheet is used for the purpose of preventing the slurry from adhering to a pressing apparatus when the coating film is pressed, absorbing the excess electrolyte solution exuded during the pressing, and the like. Therefore, the material and the form of the porous sheet are not particularly limited as long as they can achieve the above-described purposes.

For example, the same ones as a microporous membrane, a non-woven fabric, and the like which are used as a separator in the present technical field can be used as the porous sheet. Specific examples of the microporous membrane include microporous membranes formed of a hydrocarbon-based resin such as polyimide, aramid, or polyvinylidene fluoride-hexafluoropropylene (PVdF-HFP), a glass fiber, and the like. Further, examples of the non-woven fabric include non-woven fabrics using cotton, rayon, acetate, nylon, or polyester; polyolefin such as PP and PE; polyimide, aramid, or the like either singly or as a mixture.

Incidentally, the porous sheet may be removed after pressing or may also be used as it is as a separator of a battery. In a case where the porous sheet is used as it is as the separator after pressing, an electrolyte layer may be formed using the porous sheet alone as the separator, or an electrolyte layer may also be formed by combining the porous sheet with another separator (that is, using two or more separators).

The pressing apparatus for performing the pressing treatment is preferably an apparatus with which a pressure is uniformly applied to the entire surface of the coating film, and specifically, HIGH PRESSURE JACK J-1 (manufactured by AS ONE Corporation) can be used. The pressure at the time of pressing is not particularly limited, but is preferably 5 to 40 MPa, more preferably 10 to 35 MPa, and further preferably 12 to 30 MPa. When the pressure is in the above range, the porosity or the density of the electrode active material layer according to the aforementioned preferred embodiment can be easily realized.

<Constituent Elements Other than Electrode>

Hereinbefore, the electrode and the producing method therefor among constituent elements of the bipolar type secondary battery according to the preferred embodiment of the present invention have been described in detail, but regarding other constituent elements, appropriate reference can be made to the conventionally known knowledge.

(Electrolyte Layer)

The electrolyte to be used in the electrolyte layer of this embodiment is not particularly limited, and a liquid electrolyte, a gel polymer electrolyte, or an ionic liquid electrolyte is used without limitation. By using these electrolytes, high lithium ion conductivity may be secured.

The liquid electrolyte has a function as a lithium ion carrier. The liquid electrolyte constituting the electrolyte layer has the form in which a lithium salt is dissolved in a solvent. As the solvent and the lithium salt to be used, for example, the solvent and the lithium salt exemplified as a solvent and a lithium salt to be used for constituting the electrode active material slurry in the method for producing a battery electrode according to the aspect may be similarly used. Further, the aforementioned additive may be contained in the liquid electrolyte. Incidentally, the concentration of the lithium salt in the liquid electrolyte is preferably 0.1 to 3.0 M and more preferably 0.8 to 2.2 M. Further, the use amount in the case of using an additive is preferably 0.5 to 10% by mass and more preferably 0.5 to 5% by mass with respect to 100% by mass of the liquid electrolyte before adding an additive.

The gel polymer electrolyte has a configuration in which the above-described liquid electrolyte is injected to a matrix polymer (host polymer) consisting of an ion conductive polymer. Using the gel polymer electrolyte as an electrolyte is excellent in that the fluidity of an electrolyte disappears and ion conductivity between layers is easily blocked. Examples of an ion conductive polymer which is used as a matrix polymer (host polymer) include polyethylene oxide (PEO), polypropylene oxide (PPO), polyethylene glycol (PEG), polyacrylonitrile (PAN), polyvinylidene fluoride-hexafluoropropylene (PVdF-HEP), polymethyl methacrylate (PMMA), copolymers thereof, and the like.

The matrix polymer of a gel polymer electrolyte can exhibit excellent mechanical strength by forming a cross-linked structure. For forming a cross-linked structure, it is sufficient to perform a polymerization treatment of a polymerizable polymer for forming a polymer electrolyte (for example, PEO and PPO) such as thermal polymerization, UV polymerization, radiation polymerization, and electron beam polymerization, by using a suitable polymerization initiator.

The ionic liquid electrolyte is obtained by dissolving a lithium salt in an ionic liquid. Incidentally, the ionic liquid is a salt composed of cation and anion alone and represents a series of compounds which is liquid at normal temperature.

Regarding the cationic component constituting an ionic liquid, it is preferable to use at least one selected from the group consisting of a substituted or unsubstituted imidazolium ion, a substituted or unsubstituted pyridinium ion, a substituted or unsubstituted pyrrolium ion, a substituted or unsubstituted pyrazolium ion, a substituted or unsubstituted pyrrolinium ion, a substituted or unsubstituted pyrrolidinium ion, a substituted or unsubstituted piperidinium ion, a substituted or unsubstituted triazinium ion, and a substituted or unsubstituted ammonium ion.

Specific examples of the anionic component constituting an ionic liquid include halide ion such as fluoride ion, chloride ion, bromide ion, or iodide ion, nitric acid ion ($NO_3^-$), tetrafluoroborate ion ($BF_4^-$), hexafluorophosphate ion ($PF_6^-$), $(FSO_2)_2N^-$, $AlCl_3^-$, lactic acid ion, acetate ion ($CH_3COO^-$), trifluoroacetate ion ($CF_3COO^-$), methanesulfonate ion ($CH_3SO_3^-$), trifluoromethanesulfonate ion ($CF_3SO_3^-$), bis(trifluoromethanesulfonyl)imide ion (($CF_3SO_2)_2N^-$), bis(pentafluoroethylsulfonyl)imide ion (($C_2F_5SO_2)_2N^-$), $BF_3C_2F_5^-$, tris(trifluoromethanesulfonyl) carbon acid ion (($CF_3SO_2)_3C^-$), perchlorate ion ($ClO_4^-$), dicyanamide ion (($CN)_2N^-$), organic sulfuric acid ion, organic sulfonic acid ion, $R^1COO^-$, $HOOCR^1COO^-$, $^-OOCR^1COO^-$, $NH_2CHR^1COO^-$ (in this case, $R^1$ is a substituent and represents an aliphatic hydrocarbon group, an alicyclic hydrocarbon group, an aromatic hydrocarbon group, an ether group, an ester group, or an acyl group, and the substituent may include a fluorine atom), and the like.

Preferred examples of the ionic liquid include 1-methyl-3-methylimidazolium bis(trifluoromethanesulfonyl)imide and N-methyl-N-propylpyrrolidinium bis(trifluoromethanesulfonyl)imide. These ionic liquids may be used alone or in combination of two or more kinds thereof.

The lithium salt and the additive to be used in the ionic liquid electrolyte are the same as the lithium salt and the additive to be used in the aforementioned liquid electrolyte.

In the bipolar type secondary battery of this embodiment, a separator may be used in the electrolyte layer. The separator has a function of holding an electrolyte so as to secure the lithium ion conductivity between a positive electrode and a negative electrode and a function of serving as a partition wall between a positive electrode and a negative electrode. In particular, in a case where a liquid electrolyte or an ionic liquid electrolyte is used as an electrolyte, it is preferable to use a separator.

Examples of a separator shape include a porous sheet separator, a non-woven separator, or the like composed of a polymer or a fiber which absorbs and maintains the electrolyte.

As a porous sheet separator composed of a polymer or a fiber, for example, a microporous (microporous membrane) separator can be used. Specific examples of the porous sheet composed of a polymer or a fiber include a microporous (microporous membrane) separator which is composed of polyolefin such as polyethylene (PE) or polypropylene (PP); a laminate in which a plurality of them are laminated (for example, a laminate with three-layer structure of PP/PE/PP, or the like), and a hydrocarbon-based resin such as polyimide, aramid, or polyvinylidene fluoride-hexafluoropropylene (PVdF-HFP), glass fiber, or the like.

The thickness of the microporous (microporous membrane) separator cannot be uniformly defined as it varies depending on use of application. For example, for an application in a secondary battery or the like for operating a motor of an electric vehicle (EV), a hybrid electric vehicle (HEV), a fuel cell vehicle (FCV), or the like, the thickness of the separator is desirably 4 to 60 µm as a single layer or a multilayer. The fine pore diameter of the microporous (microporous membrane) separator is preferably 1 µm or less at most (in general, the pore diameter is about several tens of nanometers).

Examples of the non-woven separator include non-woven fabrics using conventionally known ones such as cotton, rayon, acetate, nylon, and polyester; polyolefin such as PP and PE; polyimide and aramid either singly or as a mixture. Further, the bulk density of the non-woven fabric is not particularly limited as long as sufficient battery characteristics are obtained with an impregnated polymer gel electrolyte. Furthermore, it is sufficient that the thickness of the non-woven separator is the same as that of the electrolyte layer, and the thickness thereof is preferably 5 to 200 µm and particularly preferably 10 to 100 µm.

Further, it is also preferable that a separator obtained by using the aforementioned microporous (microporous membrane) separator or non-woven separator as a porous resin substrate layer and laminating a heat resistant insulating layer thereon (separator having a heat resistant insulating layer) is used as the separator. The heat resistant insulating layer is a ceramic layer containing inorganic particles and a binder. As for the separator having a heat resistant insulating layer, those having high heat resistance, that is, a melting point or a heat softening point of 150° C. or higher, preferably 200° C. higher, are used. By having a heat resistant insulating layer, internal stress in a separator, which increases under temperature increase, is alleviated so that the effect of suppressing thermal shrinkage can be obtained. As a result, an occurrence of a short between electrodes of a battery can be prevented so that a battery configuration not easily allowing a performance reduction as caused by temperature increase is yielded. Furthermore, by having a heat resistant insulating layer, the mechanical strength of the separator having a heat resistant insulating layer is improved so that the separator hardly has a film breaking. Moreover, because of the effect of suppressing thermal shrinkage and a high level of mechanical strength, the separator is hardly curled during the process of producing a battery.

The inorganic particles in the heat resistant insulating layer contribute to the mechanical strength or the effect of suppressing thermal shrinkage of the heat resistant insulating layer. The material used as inorganic particles is not particularly limited. Examples thereof include oxides ($SiO_2$, $Al_2O_3$, $ZrO_2$, and $TiO_2$), hydroxides, and nitrides of silicon, aluminum, zirconium, and titanium, and a composite thereof. These inorganic particles may be derived from mineral resources such as boehmite, zeolite, apatite, kaolin, mullite, spinel, olivine, and mica, or artificially synthesized. Further, these inorganic particles may be used alone or in combination of two or more kinds thereof. Among them, from the viewpoint of the cost, it is preferable to use silica ($SiO_2$) or alumina ($Al_2O_3$), and it is more preferable to use alumina ($Al_2O_3$).

The weight per unit area of the inorganic particles is not particularly limited, but is preferably 5 to 15 g/m². With such a range, sufficient ion conductivity is obtained and heat resistant strength is maintained, which is preferable.

The binder in the heat resistant insulating layer has a role of attaching the inorganic particles to each other or attaching the inorganic particles to the porous resin substrate layer. With this binder, the heat resistant insulating layer is stably formed and peeling between the porous resin substrate layer and the heat resistant insulating layer is prevented.

The binder used for the heat resistant insulating layer is not particularly limited, and examples thereof which can be used as the binder include compounds such as carboxymethyl cellulose (CMC), polyacrylonitrile, cellulose, an ethylene-vinyl acetate copolymer, polyvinyl chloride, styrene-butadiene rubber (SBR), isoprene rubber, butadiene rubber, polyvinylidene fluoride (PVDF), polytetrafluoroethylene (PTFE), polyvinyl fluoride (PVF), and methyl acrylate. Among these, carboxymethyl cellulose (CMC), methyl acrylate, or polyvinylidene fluoride (PVDF) is preferably used. These compounds may be used alone or in combination of two or more kinds thereof.

The content of the binder in the heat resistant insulating layer is preferably 2 to 20% by mass with respect to 100% by mass of the heat resistant insulating layer. When the content of the binder is 2% by mass or more, the peeling strength between the heat resistant insulating layer and the porous substrate layer can be increased and vibration resistance of the separator can be enhanced. On the other hand, when the content of the binder is 20% by mass or less, a gap between inorganic particles is maintained at an appropriate level so that sufficient lithium ion conductivity can be ensured.

The thermal shrinkage rates of the separator having a heat resistant insulating layer for both MD and TD are 10% or less after maintaining for 1 hour at conditions of 150° C. and 2 gf/cm$^2$. By using a material with such high heat resistance, shrinkage of the separator can be effectively prevented even when the internal temperature of the battery reaches 150° C. due to increased heat generation amount. As a result, an occurrence of a short between electrodes of a battery can be prevented so that a battery configuration not easily allowing a performance reduction as caused by temperature increase is yielded.

[Positive Electrode Current Collecting Plate and Negative Electrode Current Collecting Plate]

The material constituting the current collecting plate (25, 27) is not particularly limited, and a known highly conductive material which has been conventionally used for a current collecting plate for a lithium ion secondary battery can be used. As the material constituting the current collecting plate, for example, metal materials such as aluminum, copper, titanium, nickel, stainless steel (SUS), and an alloy thereof are preferred. From the viewpoint of light weightiness, resistance to corrosion, and high conductivity, aluminum and copper are more preferred, and aluminum is particularly preferred. Incidentally, the same material or a different material may be used for the positive electrode current collecting plate 25 and the negative electrode current collecting plate 27.

[Positive Electrode Lead and Negative Electrode Lead]

Further, although not illustrated in the drawing, the current collector 11 and the current collecting plate (25, 27) may be electrically connected to each other via a positive electrode lead or a negative electrode lead. The same material used for a lithium ion secondary battery of a related art can be also used as a material constituting the positive and negative electrode leads. Incidentally, a portion drawn from an outer casing is preferably coated with a heat resistant and insulating thermally shrunken tube or the like so that it has no influence on a product (for example, an automobile component, in particular, an electronic device or the like) according to electric leak after contact with peripheral devices, wirings, or the like.

[Sealing Portion (Insulating Layer)]

The sealing portion (insulating layer) has a function of preventing contact between the current collectors adjacent to each other and preventing a short circuit caused at the end portion of the single battery layer. The material constituting the sealing portion may be any materials as long as it has an insulation property, a sealing property (sealing performance) to prevent the solid electrolyte from coming off and prevent permeation of external moisture, heat resistance under battery operation temperature and the like. For example, an acrylic resin, a urethane resin, an epoxy resin, a polyethylene resin, a polypropylene resin, a polyimide resin, rubber (ethylene-propylene-diene rubber: EPDM), or the like may be used. Further, an isocyanate adhesive, an acrylic resin adhesive, a cyanoacrylate adhesive, or the like may be used, and a hot-melt adhesive (urethane resin, polyamide resin, or polyolefin resin) or the like may also be used. Among these, from the viewpoint of corrosion resistance, chemical resistance, ease of production (film-forming performance), economical efficiency, and the like, a polyethylene resin or a polypropylene resin is preferably used as a material constituting the insulating layer, and a resin containing an amorphous polypropylene resin as a main component and obtained by copolymerizing ethylene, propylene, and butene is preferably used.

[Battery Outer Casing Body]

As a battery outer casing body, an envelope-shaped casing capable of covering a power generating element as illustrated in FIG. 1, in which the laminate film 29 containing aluminum is used, may be used in addition to a known metal can casing. As for the laminate film, for example, a laminate film with a three-layered structure formed by laminating PP, aluminum, and nylon in this order, or the like can be used, but is not limited thereto. From the viewpoint of having higher output power and excellent cooling performance, and of being suitably usable for a battery for a large instrument such as an EV or an HEV, a laminate film is desirable. Further, since the group pressure applied from outside to the power generating element can be easily controlled and thus the thickness of an electrolyte solution layer can be easily controlled to a desired value, an aluminate laminate is more preferred for an outer casing body.

Since the bipolar type secondary battery of this embodiment has a negative electrode for the non-aqueous electrolyte secondary battery described above, output characteristics can be improved at a high rate. Therefore, the bipolar type secondary battery of this embodiment is suitably used as a power source for driving EV or HEV.

[Cell Size]

Figure 3:
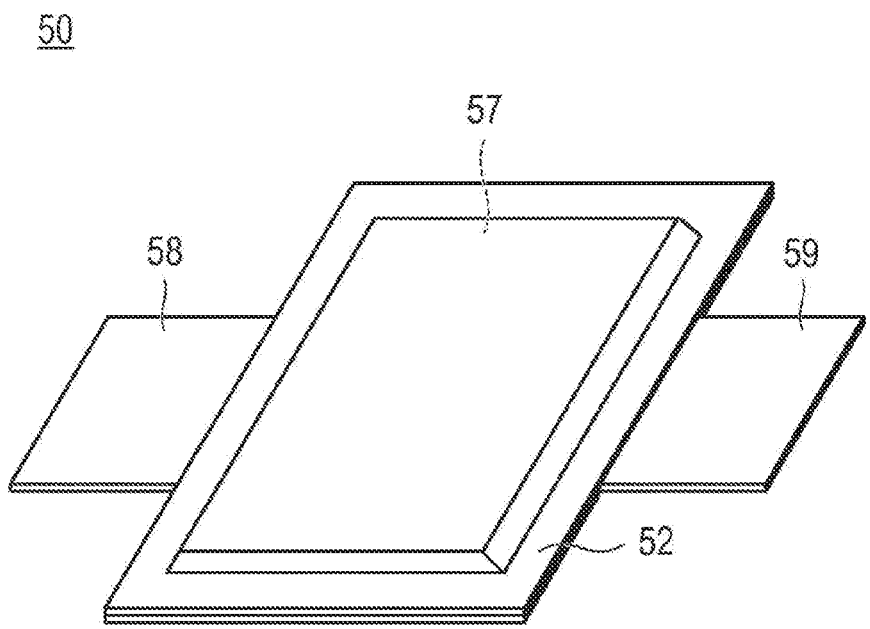
FIG. 3 is a perspective view illustrating the appearance of a flat lithium ion secondary battery as a representative embodiment of a secondary battery.

FIG. 3 is a perspective view illustrating the appearance of a flat lithium ion secondary battery as a representative embodiment of a secondary battery.

As illustrated in FIG. 3, a flat bipolar type secondary battery 50 has a flat and rectangular shape, and from both sides, a positive electrode tab 58 and a negative electrode tab 59 are drawn to extract electric power. A power generating element 57 is covered by a battery outer casing body (laminate film 52) of the bipolar type secondary battery 50 with its periphery fused by heat, and the power generating element 57 is sealed in a state in which the positive electrode tab 58 and the negative electrode tab 59 are drawn to the outside. Herein, the power generating element 57 corresponds to the power generating element 21 of the bipolar type secondary battery 10 illustrated in FIG. 1 as described above. In the power generating element 57, a plurality of the bipolar type electrodes 23 are stacked on top of each other via the electrolyte layers 17.

Incidentally, the lithium ion secondary battery is not limited to a flat shape of stack type. A winding type lithium ion secondary battery may have a barrel shape, a flat and rectangular shape obtained by modifying the barrel shape, or the like, and there is no particular limitation. As an outer casing material of the barrel shape, a laminate film may be used, a barrel can (metal can) of a related art may be used, or the like, and thus there is no particular limitation. Preferably, the power generating element is encased with an aluminum laminate film. The weight reduction may be achieved with such a shape.

Further, drawing of the tab (58, 59) illustrated in FIG. 3 is also not particularly limited. The positive electrode tab 58 and the negative electrode tab 59 may be drawn from the same side, each of the positive electrode tab 58 and the negative electrode tab 59 may be divided into plural tabs and drawn from each side, or the like, thus there is no particular limitation on the embodiment illustrated in FIG. 3. Further, in a winding type lithium ion battery, a terminal may be formed, for example, by using a barrel can (metal can) instead of a tab.

A typical electric vehicle has a battery storage space of about 170 L. Since a cell and an auxiliary machine such as a device for controlling charge and discharge are stored in this space, storage space efficiency of a cell is generally about 50%. The cell loading efficiency for this space is a factor of determining the cruising distance of an electric vehicle. As the size of a single cell decreases, the loading efficiency is lowered, and thus the cruising distance cannot be ensured.

Therefore, in the present invention, the battery structure of which power generating element is covered with an outer casing body preferably has a large size. Specifically, the length of the short side of a laminate cell battery is preferably 100 mm or more. Such a large-sized battery can be used for a vehicle. Herein, the length of the short side of the laminate cell battery indicates the length of the shortest side. The upper limit of the length of the short side is not particularly limited, but is generally 400 mm or less.

[Volume Energy Density and Rated Discharge Capacity]

In a general electric vehicle, a driving distance (cruising distance) of 100 km per one charge is needed according to the market requirement. Considering such a cruising distance, the volume energy density of the battery is preferably 157 Wh/L or more and the rated capacity is preferably 20 Wh or more.

Further, from the viewpoint of a large-sized battery which is different from the viewpoint of the physical size of an electrode, it is also possible to define the large size of a battery in view of a relation of battery area or battery capacity. For example, in the case of a flat stack type laminated battery, the value of the ratio of a battery area (the projected area of a battery including a battery outer casing body) to the rated capacity is 5 $cm^2$/Ah or more, and in a battery having a rated capacity of 3 Ah or more, the battery area per unit capacity is large so that the object of the present invention is easy to further manifest. That is, the charge and discharge reaction hardly proceeds uniformly in the plane direction as well as in the thickness direction of the negative electrode active material layer due to the ion movement resistance and the electron movement resistance according to an increase in thickness of the negative electrode active material layer, and output characteristics of the battery (particularly, output characteristics at a high rate) are more easily decreased. Therefore, the non-aqueous electrolyte secondary battery according to this embodiment is preferably a large-sized battery as described above from the viewpoint of having a larger merit obtained from exhibition of the working effects of the invention of the present application. Furthermore, the aspect ratio of a rectangular electrode is preferably 1 to 3 and more preferably 1 to 2. Incidentally, the aspect ratio of the electrode is defined by longitudinal/transversal ratio of a positive electrode active material layer with a rectangular shape. By having the aspect ratio in this range, there is an advantage in that it is possible to achieve both performance required in vehicles and a mounting space.

[Assembled Battery]

An assembled battery is constituted by connecting a plurality of batteries. Specifically, the assembled battery is constituted by connecting at least two or more batteries in series, in parallel, or in series and parallel. It is possible to freely control the capacity and voltage by connecting the batteries in series and in parallel.

It is also possible to form a detachable small-sized assembled battery by connecting a plurality of batteries in series or in parallel. Moreover, by further connecting a plurality of detachable small-sized assembled batteries in series or parallel, it is also possible to form an assembled battery having a high capacity and a high output which is suitable as a power source or auxiliary power source for driving a vehicle requiring a high volume energy density and a high volume output density. The number of the connected batteries for producing an assembled battery or the number of the laminated small-sized assembled batteries for producing an assembled battery having a high capacity may be determined depending on the capacity or output of the battery that is mounted to a vehicle (electric vehicle).

[Vehicle]

The non-aqueous electrolyte secondary battery of this embodiment maintains a discharge capacity even when being used for a long period of time and thus exhibits favorable cycle characteristics. Further, the volume energy density is high. For use in a vehicle such as an electric vehicle, a hybrid electric vehicle, a fuel cell car, or a hybrid fuel cell vehicle, a long lifespan is required as well as a high capacity and a large size compared to use in electric and mobile electronic devices. Therefore, the non-aqueous electrolyte secondary battery can be suitably utilized as a power source for a vehicle, for example, as a power source or auxiliary power source for driving a vehicle.

Specifically, the battery or the assembled battery formed by combining a plurality of batteries can be mounted on a vehicle. In the present invention, a battery exhibiting excellent long term reliability and output characteristics and having a long lifespan can be formed, and thus, by mounting such a battery, a plug-in hybrid electric vehicle having a long EV driving distance and an electric vehicle having a long driving distance per one charge can be constituted. This is because a vehicle having a long lifespan and high reliability can be provided as the battery or an assembled battery formed by combining a plurality of batteries is used in, for example, a vehicle such as a hybrid car, a fuel cell car, or an electric vehicle (including a two-wheel vehicle (motor bike) or a three-wheel vehicle in addition to all four-wheel vehicles (a passenger vehicle, a truck, a commercial vehicle such as a bus, a compact car, or the like)). However, the use is not limited to a vehicle, but the battery of the assembled battery can be applied to various kinds of power sources of other vehicles, for example, a moving object such as an electric train, and can be also utilized as a built-in power source of an uninterruptible power-supply system and the like.

EXAMPLES

Hereinafter, the present invention will be described in more detail by means of Examples. However, the technical scope of the present invention is not limited only to the following Examples. Incidentally, "part(s)" means "part(s) by mass" unless specifically described otherwise. Further, the production processes from production of the resin solution for coating to coating of the negative electrode active material slurry were carried out in a dry room.

<Tensile Elongation at Break of Coating Resin in Saturated Liquid Absorption State>

The resin solution for coating obtained by the method described in this Example was cast on a PET film and dried to form a sheet-shaped film having a thickness of 500 μm and then the sheet-shaped film was punched in a dumbbell form. Then, after the film was immersed in an electrolyte solution (1M $LiPF_6$, ethylene carbonate (EC)/diethyl carbonate (DEC)=3/7 (volume ratio)) at 50° C. for 3 days, a value of the tensile elongation at break in a saturated liquid absorption state was measured according to ASTM D683 (test piece shape Type II).

<Preparation of Resin Solution for Coating Negative Electrode Active Material>

To a four-necked flask equipped with a stirrer, a thermometer, a reflux condenser, a dropping funnel, and a nitrogen gas introducing tube, 83 parts of ethyl acetate and 17 parts of methanol were charged, and the temperature was increased to 68° C.

Next, a monomer blend solution obtained by blending 242.8 parts of methacrylic acid, 97.1 parts of methyl methacrylate, 242.8 parts of 2-ethylhexyl methacrylate, 52.1 parts of ethyl acetate, and 10.7 parts of methanol and an initiator solution obtained by dissolving 0.263 part of 2,2'-azobis(2,4-dimethylvaleronitrile) in 34.2 parts of ethyl acetate were continuously added dropwise to the four-necked flask with a dropping funnel while blowing nitrogen thereinto, under stirring over 4 hours, to perform radical polymerization. After completion of dropwise addition, an initiator solution obtained by dissolving 0.583 part of 2,2'-azobis(2,4-dimethylvaleronitrile) in 26 parts of ethyl acetate was continuously added using a dropping funnel over 2 hours. Further, the polymerization was continued at a boiling point for 4 hours. The solvent was removed to obtain 582 parts of resin, and then 1,360 parts of isopropanol was added, thereby obtaining a resin solution for coating a negative electrode active material containing a vinyl resin having a resin solid content concentration of 30% by mass.

Incidentally, the tensile elongation at break of the resin for coating a negative electrode active material in a saturated liquid absorption state was measured using the obtained resin solution for coating a negative electrode active material by the above-described method and the tensile elongation at break was 50%.

<Preparation of Coated Negative Electrode Active Material>

88.4 parts of non-graphitizable carbon (hard carbon) (CARBOTRON (registered trademark) PS(F) manufactured by Kureha Battery Materials Japan Co., Ltd.) was put in a universal mixer, the resin solution for coating a negative electrode active material obtained above (resin solid content concentration: 30% by mass) was added dropwise over 60 minutes at room temperature in a state of being stirred at 150 rpm and mixed so that the resin solid content became 10 parts, and the resultant mixture was further stirred for 30 minutes.

Next, 1.6 parts of acetylene black [DENKA BLACK (registered trademark) manufactured by Denka Company Limited] was mixed in three separate portions in a state of being stirred, the temperature was increased to 70° C. while still stirring for 30 minutes, and the pressure was maintained to 0.01 MPa for 30 minutes, thereby obtaining a coated negative electrode active material. Incidentally, if it is considered that the coated negative electrode active material has a core-shell structure, the average particle diameter of non-graphitizable carbon powder as the core was 9 μm. Further, the solid content amount of the coating agent was 1.6% by mass with respect to 100% by mass of the coated negative electrode active material.

<Preparation of Electrolyte Solution>

Li[$(FSO_2)_2$N] (LiFSI) was dissolved in a mixed solvent of ethylene carbonate (EC) and propylene carbonate (PC) (volume ratio 1:1) at a ratio of 2 mol/L to obtain an electrolyte solution.

<Preparation of Negative Electrode Active Material Slurry>

616 parts of particles having an average particle diameter (D50) of 20 μm were taken out and 264 parts of particles having an average particle diameter (D50) of 5 μm were taken out from the coated negative electrode active material obtained above, and 76.5 parts of carbon fiber (manufactured by Osaka Gas Chemicals Co., Ltd., DONACARBO Milled S-243: average fiber length 500 μm, average fiber diameter 13 μm: electrical conductivity 200 mS/cm) was added as a conductive member thereto and was dried at 120° C. under reduced pressure of 100 mmHg for 16 hours to remove the contained water content.

Next, in the dry room, 637.7 parts of the electrolyte solution obtained above was added to the dried material. This mixture was stirred using a mixing and stirring machine (manufactured by DALTON CORPORATION, 5DM-r type (planetary mixer)) at the numbers of revolutions of rotation: 63 rpm and revolution: 107 rpm for 30 minutes, thereby performing stiff-kneading.

Thereafter, 638.9 g of the electrolyte solution obtained above was further added and stirred using the same mixing and stirring machine as described above at the number of revolutions of rotation: 63 rpm and revolution: 107 rpm for 10 minutes three times, thereby performing stiff-kneading. In this way, a negative electrode active material slurry was obtained. Incidentally, the solid content concentration of the negative electrode active material slurry obtained in this way was 41% by mass.

<Acquirement of Shear Rate (Horizontal Axis)-Shear Stress (Vertical Axis) Curve of Negative Electrode Active Material Slurry>

The shear stress of the negative electrode active material slurry prepared above was measured in a shear rate range of 0.01 to 1000 [l/s] using AR-200 rheometer manufactured by TA Instruments to acquire a shear rate (horizontal axis)-shear stress (vertical axis) curve. More specifically, a measurement jig and a measurement protocol shown in the following Table 1 were employed, the above-described rheometer was used, a parallel plate having a size of Φ40 mm was used, a measurement gap between the stage and the plate at the time of measurement was set to 300 μm, and measurement for 26 points was performed by a Log sweep in a scanning range of the shear rate of 0.01 to 1000 [l/s] for a measurement time of 7.5 minutes.

TABLE 1

| Setting target | Item | Condition (numerical value) |
|---|---|---|
| Measurement jig | Plate size | φ40 [mm] |
|  | Shape | Parallel plate |
| Measurement protocol | Measurement gap | 300 [μm] |
|  | Measurement start shear rate | 0.01 [1/s] |
|  | Measurement end shear rate | 1000 [1/s] |
|  | Sweep | Log |
|  | Measurement point | 26 points |
|  | Measurement time | About 7.5 [min.] |

The shear rate (horizontal axis)-shear stress (vertical axis) curve obtained in this way is shown in FIG. 2. Incidentally, in FIG. 2, by extrapolating the curve of actually measured values toward the vertical axis (the straight line of a shear rate of 0.001 [1/s]), a value (100 [Pa]) of the yield stress of the negative electrode active material slurry was obtained as the section in the vertical axis was obtained.

As shown in FIG. 2, from the shear rate (horizontal axis)-shear stress (vertical axis) curve of the negative electrode active material slurry prepared above, a region having a shear stress smaller than the yield stress (shear rate of 0.0001 to 14 [1/s]) and a region having a shear stress larger than the yield stress (shear rate of 14 [1/s] or more) are divided based on a shear rate of 14 [1/s] as a boundary. Further, as shown in FIG. 2, a region A in which the shear stress is not increased according to an increase in shear rate is present and a region B in which a shear stress is increased and an increase rate thereof is decreased according to an increase in shear rate is present in a region having a shear rate larger than that of the region A.

<Coating of Coating Liquid (Negative Electrode Active Material Slurry) on Current Collector Surface>

Comparative Example 1

First, a copper foil (manufactured by THANK-METAL CO., LTD., thickness: 10 μm) functioning as a current collector for lithium ions was prepared as a base material. Next, the negative electrode active material slurry prepared above was coated on one surface of the copper foil by a die slit method using a slit die coater to form a coating film (negative electrode active material layer) having a thickness of 500 μm. At this time, in this Comparative Example, the coating rate was set to 2 [mm/s]. Therefore, the shear rate was 2 [mm/s]/0.5 [mm]=4 [1/s], and the shear stress corresponding to this was a value smaller than the yield stress of the used negative electrode active material slurry.

Example 1

A coating film (negative electrode active material layer) was formed on the surface of the current collector by the same method as in Comparative Example 1 described above, except that the coating rate was set to 9 [mm/s]. Incidentally, since the coating rate in this Example was 9 [mm/s], the shear rate was 9 [mm/s]/0.5 [mm]=18 [1/s], and the shear stress corresponding to this was a value larger than the yield stress of the used negative electrode active material slurry.

Example 2

A coating film (negative electrode active material layer) was formed on the surface of the current collector by the same method as in Comparative Example 1 described above, except that the coating rate was set to 18 [mm/s]. Incidentally, since the coating rate in this Example was 18 [mm/s], the shear rate was 18 [mm/s]/0.5 [mm]=36 [1/s], and the shear stress corresponding to this was a value larger than the yield stress of the used negative electrode active material slurry.

Example 3

A coating film (negative electrode active material layer) was formed on the surface of the current collector by the same method as in Comparative Example 1 described above, except that the coating rate was set to 70 [mm/s]. Incidentally, since the coating rate in this Example was 70 [mm/s], the shear rate was 70 [mm/s]/0.5 [mm]=140 [1/s], and the shear stress corresponding to this was a value larger than the yield stress of the used negative electrode active material slurry.

Example 4

A coating film (negative electrode active material layer) was formed on the surface of the current collector by the same method as in Comparative Example 1 described above, except that the coating rate was set to 150 [mm/s]. Incidentally, since the coating rate in this Example was 150 [mm/s], the shear rate was 150 [mm/s]/0.5 [mm]=300 [1/s], and the shear stress corresponding to this was a value larger than the yield stress of the used negative electrode active material slurry.

Example 5

A coating film (negative electrode active material layer) was formed on the surface of the current collector by the same method as in Comparative Example 1 described above, except that the coating rate was set to 200 [mm/s]. Incidentally, since the coating rate in this Example was 200 [mm/s], the shear rate was 200 [mm/s]/0.5 [mm]=400 [1/s], and the shear stress corresponding to this was a value larger than the yield stress of the used negative electrode active material slurry.

[Evaluation of Flatness of Coating Film Surface]

Figure 4:
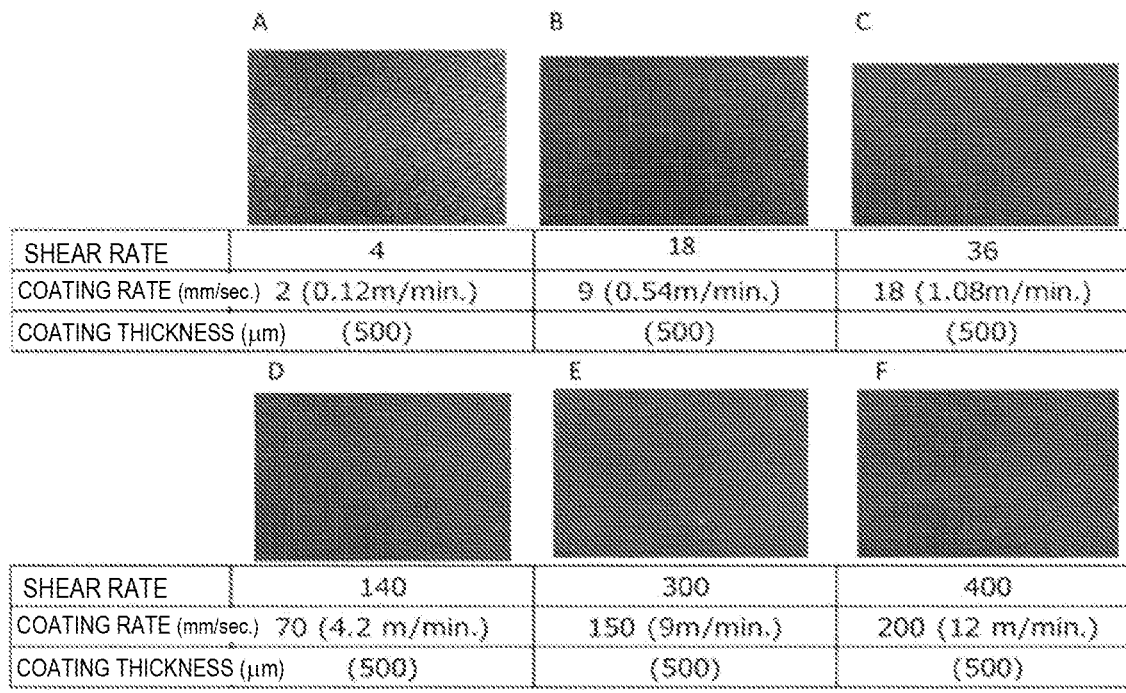
FIG. 4 shows observation photographs of negative electrode active material layers prepared in Comparative Example 1 and Examples 1 to 5 described later.

The flatness of the surface of each coating film (negative electrode active material layer) prepared in Comparative Example 1 and Examples 1 to 5 described above was evaluated by visual inspection. Further, observation photographs of these coating films (negative electrode active material layers) are shown in A to F of FIG. 4, respectively. As shown in A to F of FIG. 4, a large number of irregularities were confirmed on the obtained surface (negative electrode active material layer) in Comparative Example 1 (A of FIG. 4) and a flat coating film (negative electrode active material layer) was not obtainable. On the other hand, in Examples 1 to 5 (B to F of FIG. 4), irregularities were not almost confirmed on the surface of the obtained coating film (negative electrode active material layer) and a flat coating film (negative electrode active material layer) was obtainable.

<Preparation of Resin Solution for Coating Positive Electrode Active Material>

To a four-necked flask equipped with a stirrer, a thermometer, a reflux condenser, a dropping funnel, and a nitrogen gas introducing tube, 59.2 parts of dimethylformamide was charged, and the temperature was increased to 79° C.

Next, a monomer blend solution obtained by blending 30.1 parts of methacrylic acid, 13.9 parts of methyl methacrylate, and 30.5 parts of 2-ethylhexyl methacrylate and an initiator solution obtained by dissolving 0.125 part of 2,2'-azobis(2,4-dimethylvaleronitrile) and 0.300 part of 2,2'-azobis(2-methylbutyronitrile) in 15.0 parts of dimethylformamide were continuously added dropwise to the four-necked flask with a dropping funnel while blowing nitrogen thereinto, under stirring over 3 hours, to perform radical polymerization. After completion of dropwise addition, 0.75 part of dimethylformamide was added dropwise and the polymerization was continued for 2 hours. Further, the temperature was increased to 90° C. and the polymerization was continued for 1 hour. After cooling the four-necked flask, 99.8 parts of dimethylformamide was added to obtain 250.0 parts of resin solution for coating a positive electrode active material containing a vinyl resin having a resin solid content concentration of 30% by mass.

Incidentally, the tensile elongation at break of the resin for coating a positive electrode active material in a saturated liquid absorption state was measured using the obtained resin solution for coating a positive electrode active material by the above-described method and the tensile elongation at break was 50%.

<Preparation of Coated Positive Electrode Active Material>

140.0 parts of lithium nickel-aluminum-cobalt oxide (NCA) (manufactured by BASF TODA Battery Materials LLC) was put in a universal mixer, a solution obtained by additionally mixing 14.6 parts of dimethylformamide with 0.48 part of the resin solution for coating a positive electrode active material obtained above (resin solid content concentration: 30% by mass) was added dropwise over 3 minutes at room temperature in a state of being stirred at 15 m/s and mixed, and the resultant mixture was further stirred for 5 minutes.

Next, 8.6 parts of acetylene black [DENKA BLACK (registered trademark) manufactured by Denka Company Limited] was mixed in a state of being stirred, the temperature was increased to 140° C. while still stirring for 60 minutes, and the pressure was maintained to 0.01 MPa for 5 hours, thereby obtaining a coated positive electrode active material. Incidentally, if it is considered that the coated positive electrode active material has a core-shell structure, the average particle diameter of lithium nickel-aluminum-cobalt oxide particles as the core was 6 μm. Further, the solid content amount of the coating agent was 0.1% by mass with respect to 100% by mass of the coated positive electrode active material.

<Preparation of Electrolyte Solution>

Li[(FSO$_2$)$_2$N] (LiFSI) was dissolved in a mixed solvent of ethylene carbonate (EC) and propylene carbonate (PC) (volume ratio 1:1) at a ratio of 2 mol/L to obtain an electrolyte solution.

<Preparation of Positive Electrode Active Material Slurry>

31.5 parts of carbon fiber (manufactured by Osaka Gas Chemicals Co., Ltd., DONACARBO Milled S-243: average fiber length 500 μm, average fiber diameter 13 μm: electrical conductivity 200 mS/cm) was added as a conductive member to 1543.5 parts of the coated positive electrode active material obtained above and was dried at 120° C. under reduced pressure of 100 mmHg for 16 hours to remove the contained water content.

Next, in the dry room, 393.8 parts of the electrolyte solution obtained above was added to the dried material. This mixture was stirred using a mixing and stirring machine (manufactured by DALTON CORPORATION, 5DM-r type (planetary mixer)) at the numbers of revolutions of rotation: 63 rpm and revolution: 107 rpm for 30 minutes, thereby performing stiff-kneading.

Thereafter, 417.6 parts of electrolyte solution was further added to the mixture obtained above and stirred using the same mixing and stirring machine as described above at the numbers of revolutions of rotation: 63 rpm and revolution: 107 rpm for 10 minutes three times, thereby performing stirring and diluting. In this way, a positive electrode active material slurry was obtained. Incidentally, the solid content concentration of the positive electrode active material slurry obtained in this way was 66% by mass.

<Acquirement of Shear Rate (Horizontal Axis)-Shear Stress (Vertical Axis) Curve of Positive Electrode Active Material Slurry>

A shear rate (horizontal axis)-shear stress (vertical axis) curve of the positive electrode active material slurry prepared above was acquired by the same method as described above.

Figure 5:
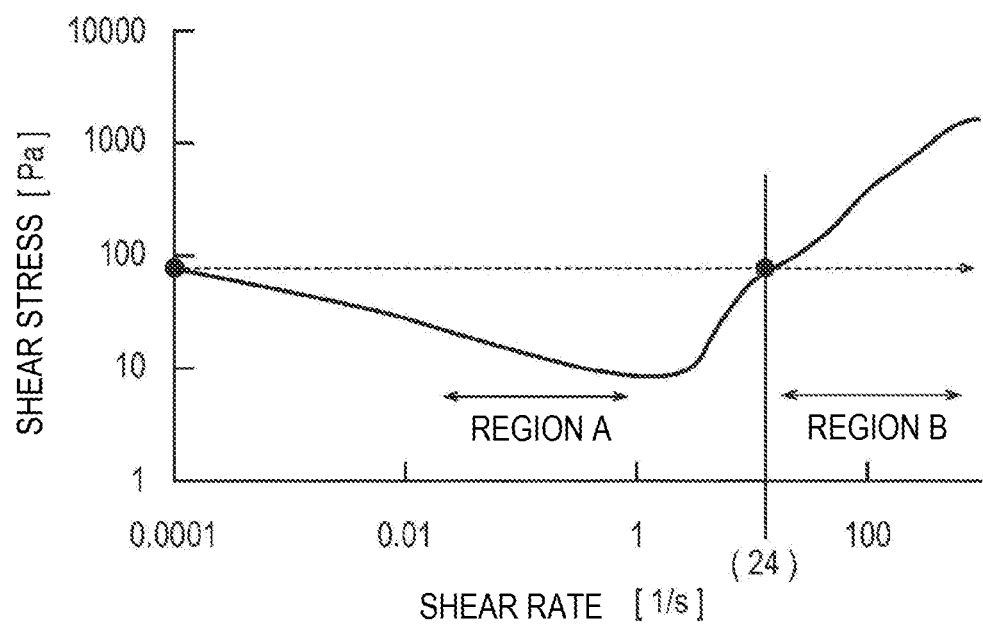
FIG. 5 is a graph showing a shear rate (horizontal axis)-shear stress (vertical axis) curve obtained by measuring a shear stress of a slurry for a positive electrode active material layer prepared in the section of Examples described later in a shear rate range of 0.01 to 1000 [1/s], using AR-200 rheometer manufactured by TA Instruments.

The shear rate (horizontal axis)-shear stress (vertical axis) curve obtained in this way is shown in FIG. 5. Incidentally, in FIG. 5, by extrapolating the curve of actually measured values toward the vertical axis (the straight line of a shear rate of 0.001 [l/s]), a value (100 [Pa]) of the yield stress of the positive electrode active material slurry was obtained as the section in the vertical axis was obtained.

As shown in FIG. 5, from the shear rate (horizontal axis)-shear stress (vertical axis) curve of the positive electrode active material slurry prepared above, a region having a shear stress smaller than the yield stress (shear rate of 0.0001 to 24 [l/s]) and a region having a shear stress larger than the yield stress (shear rate of 24 [l/s] or more) are divided based on a shear rate of 24 [l/s] as a boundary. Further, as shown in FIG. 5, the region A in which the shear stress is not increased according to an increase in shear rate is present and the region B in which a shear stress is increased and an increase rate thereof is decreased according to an increase in shear rate is present in a region having a shear rate larger than that of the region A.

The present application is based on Japanese Patent Application No. 2017-196922 which has been filed in Japan on Oct. 10, 2017, and the disclosures of which are incorporated herein by reference in their entirety.

REFERENCE SIGNS LIST 10, 50 Bipolar type secondary battery
11 Current collector
11a Outermost layer current collector on positive electrode side
11b Outermost layer current collector on negative electrode side
13 Positive electrode active material layer
15 Negative electrode active material layer
17 Electrolyte layer
19 Single battery layer
21, 57 Power generating element
23 Bipolar type electrode
25 Positive electrode current collecting plate (positive electrode tab)
27 Negative electrode current collecting plate (negative electrode tab)
29, 52 Laminate film
31 Sealing portion (insulating layer)
58 Positive electrode tab
59 Negative electrode tab

The invention claimed is:

1. A method for producing a battery electrode which has a current collector and an electrode active material layer disposed on a surface of the current collector and containing an electrode active material, the method comprising:

a coating step of coating an electrode active material slurry in which the electrode active material is dispersed in a solvent on the surface of the current collector to form the electrode active material layer, wherein the electrode active material slurry has flow characteristics that a region A in which a shear stress is not increased according to an increase in shear rate is present and a region B in which a shear stress is increased and an increase rate thereof is decreased according to an increase in shear rate is present in a region having a shear rate larger than that of the region A, in a shear rate (horizontal axis)-shear stress (vertical axis) curve of the electrode active material slurry, wherein the shear rate (horizontal axis)-shear stress (vertical axis) curve is obtained using an AR-200 rheometer, a measurement jig having a plate size of Φ40 mm and a parallel plate shape, and a measurement protocol including a measurement gap between a stage and plate of 300 μm, a measurement start shear rate of 0.01/s, a measurement end shear rate of 1000/s, a Log sweep, 26 measurement points, and a measurement time of about 7.5 minutes, and coating of the electrode active material slurry is performed at a coating rate at which the shear rate at the time of coating is a value in which a shear stress equal to or more than a yield stress of the electrode active material slurry is applied in the coating step, wherein a content of a binder in the electrode active material layer is 1% by mass or less with respect to 100% by mass of the total solid content amount, wherein, in a case where the electrode active material slurry is a positive electrode active material slurry, a solid content concentration of the electrode active material slurry is 60% by mass or more, and in a case where the electrode active material slurry is a negative electrode active material slurry, a solid content concentration of the electrode active material slurry is 40% by mass or more.

2. The method for producing a battery electrode according to claim 1, wherein the electrode active material slurry contains a liquid electrolyte constituting the battery as the solvent.

3. The method for producing a battery electrode according to claim 1, wherein the electrode active material layer contains a coated electrode active material in which at least a part of the surface of the electrode active material is coated with a coating agent containing a coating resin and a conductive aid.

4. The method for producing a battery electrode according to claim 3, wherein a tensile elongation at break of the coating resin in a saturated liquid absorption state is 10% or more.

5. The method for producing a battery electrode according to claim 1, wherein the electrode active material layer further contains a conductive member, and at least a part of the conductive member forms a conduction path electrically connecting two principal surfaces of the electrode active material layer and the conduction path and the electrode active material are electrically connected.

* * * * *